(12) United States Patent
Dua

(10) Patent No.: US 8,971,803 B2
(45) Date of Patent: Mar. 3, 2015

(54) METHODS OF WIRELESSLY PROVIDING DATA BETWEEN APPLICATIONS OF A FIRST ELECTRONIC DEVICE AND A SECOND ELECTRONIC DEVICE

(71) Applicant: Robin Dua, San Francisco, CA (US)

(72) Inventor: Robin Dua, San Francisco, CA (US)

( * ) Notice: Subject to any disclaimer, the term of this patent is extended or adjusted under 35 U.S.C. 154(b) by 73 days.

(21) Appl. No.: 13/975,504

(22) Filed: Aug. 26, 2013

(65) Prior Publication Data

US 2014/0024310 A1 Jan. 23, 2014

Related U.S. Application Data

(63) Continuation of application No. 13/556,445, filed on Jul. 24, 2012, now Pat. No. 8,583,044, which is a continuation of application No. 11/127,979, filed on May 12, 2005, now Pat. No. 8,244,179.

(51) Int. Cl.
*H04B 5/00* (2006.01)
*H04B 5/02* (2006.01)
(Continued)

(52) U.S. Cl.
CPC ............ *H04B 5/02* (2013.01); *G06F 17/30058* (2013.01); *H04M 1/7253* (2013.01); *H04L 12/2809* (2013.01); *H04L 12/281* (2013.01); *H04L 12/2816* (2013.01); *H04L 12/282* (2013.01); *H04L 2012/2841* (2013.01); *H04L 2012/2849* (2013.01); *H04W 88/06* (2013.01); *H04B 5/0031* (2013.01);
(Continued)

(58) Field of Classification Search
CPC ...... H04B 5/02; H04B 5/0031; H04B 5/0062; G06F 17/30058; G06F 3/048; H04M 1/7253; H04M 1/0264; H04M 1/0266; H04L 12/2809; H04L 12/281; H04L 12/2816; H04L 2012/2841; H04L 2012/2849; H04L 65/1069; H04W 88/06; H04W 4/008; H04W 4/005; H04W 76/023; G06Q 20/3278
USPC ......... 455/41.1, 41.2, 41.3, 2.01, 3.06, 556.1, 455/552.1, 557
See application file for complete search history.

(56) References Cited

U.S. PATENT DOCUMENTS 6,337,856 B1 * 1/2002 Schanhals et al. ............ 370/352
6,681,120 B1 * 1/2004 Kim ........................... 455/556.1
(Continued)

*Primary Examiner* — Marceau Milord
(74) *Attorney, Agent, or Firm* — Stanzione & Associates, PLLC

(57) ABSTRACT

A wireless media player and a related system and methodology are disclosed. One aspect of the wireless media player system pertains to a virtual connector system, apparatus, and method for the automatic establishment of wireless connectivity with other electronic devices. In one embodiment, the media player device employs the use of integrated Radio Frequency Identification (RFID) technology to exchange communication settings, media capability, and other parameters with an external device that also has integrated RFID technology. The automatic exchange of settings and other information via a proximity-based RFID data exchange allows a media player to quickly establish a secure communication link with another device via a commonly supported wireless protocol such as Ultra Wideband (UWB) or Bluetooth. Another aspect of the media player system pertains to a method of using the captured media capability of the connecting device to customize certain menu options and software parameters in the media player.

12 Claims, 19 Drawing Sheets

(51) Int. Cl.
*G06F 17/30* (2006.01)
*H04M 1/725* (2006.01)
*H04L 12/28* (2006.01)
*H04W 4/00* (2009.01)
*H04W 76/02* (2009.01)
*G06F 3/048* (2013.01)
*H04L 29/06* (2006.01)
*H04M 1/02* (2006.01)
*G06Q 20/32* (2012.01)
*H04W 88/06* (2009.01)

(52) U.S. Cl.
CPC ............ *H04B 5/0062* (2013.01); *H04W 4/008* (2013.01); *H04W 4/005* (2013.01); *H04W 76/023* (2013.01); *G06F 3/048* (2013.01); *H04L 65/1069* (2013.01); *H04M 1/0264* (2013.01); *H04M 1/0266* (2013.01); *G06Q 20/3278* (2013.01)
USPC .................... 455/41.1; 340/10.51; 340/572.1; 709/213; 709/248; 370/311; 370/338; 343/873; 369/44.29; 369/53.37; 348/838

(56) References Cited

U.S. PATENT DOCUMENTS

| | | | |
|---|---|---|---|
| 6,782,412 | B2 | 8/2004 | Brophy et al. |
| 6,788,676 | B2 | 9/2004 | Partanen et al. |
| 6,792,449 | B2 | 9/2004 | Colville et al. |
| 6,829,648 | B1 | 12/2004 | Jones et al. |
| 6,850,252 | B1 | 2/2005 | Hoffberg |
| 6,853,894 | B1 | 2/2005 | Kolls |
| 7,112,138 | B2 * | 9/2006 | Hedrick et al. ................. 463/29 |
| 7,190,257 | B2 * | 3/2007 | Maltseff et al. ............ 340/10.51 |
| 7,433,677 | B2 * | 10/2008 | Kantola et al. ................. 455/410 |
| 7,997,494 | B2 * | 8/2011 | Duncan .................... 235/472.01 |
| 8,244,179 | B2 * | 8/2012 | Dua .............................. 455/41.2 |
| 8,463,184 | B2 * | 6/2013 | Dua .............................. 455/41.2 |
| 8,548,381 | B2 * | 10/2013 | Dua .............................. 455/41.2 |
| 8,583,044 | B2 * | 11/2013 | Dua .............................. 455/41.2 |
| 8,768,256 | B2 * | 7/2014 | Dua .............................. 455/41.2 |
| 2004/0055446 | A1 | 3/2004 | Robbin et al. |
| 2004/0116074 | A1 | 6/2004 | Fujii et al. |
| 2004/0176032 | A1 | 9/2004 | Kotola et al. |
| 2004/0224638 | A1 | 11/2004 | Fadell et al. |
| 2005/0076364 | A1 | 4/2005 | Dukes et al. |
| 2005/0076388 | A1 | 4/2005 | Morse et al. |

* cited by examiner

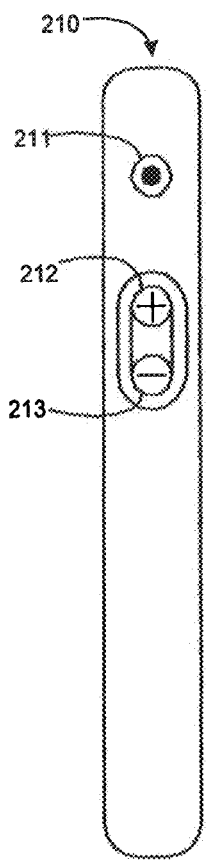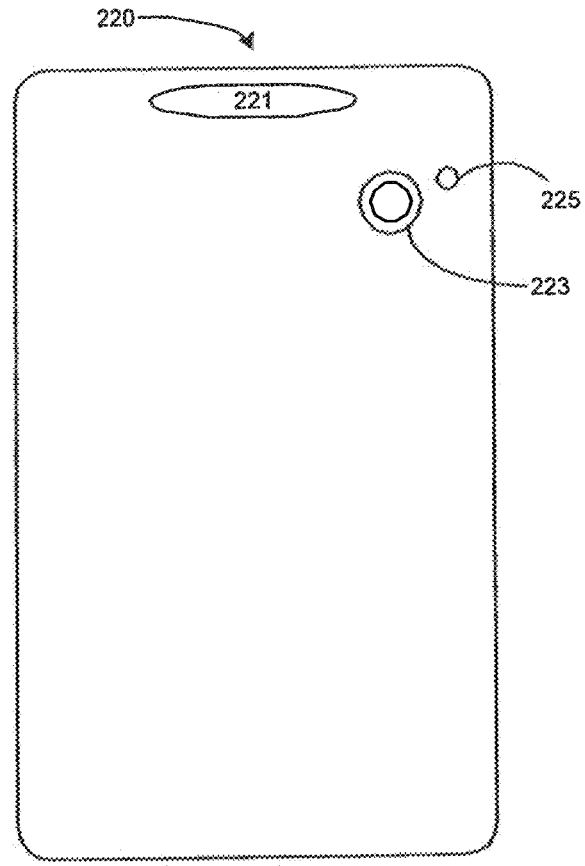
FIG. 3A          FIG. 3B
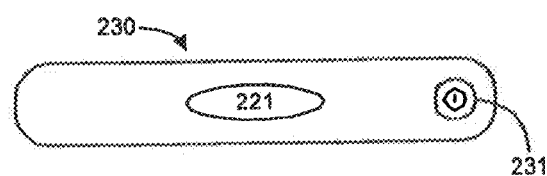
FIG. 3C
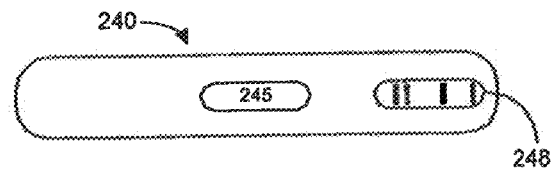
FIG. 3D

METHODS OF WIRELESSLY PROVIDING DATA BETWEEN APPLICATIONS OF A FIRST ELECTRONIC DEVICE AND A SECOND ELECTRONIC DEVICE

CROSS-REFERENCE TO RELATED APPLICATIONS

The present invention is a continuation of prior application Ser. No. 13/556,445, filed on Jul. 24, 2012, which is a continuation of and claims benefit of priority to co-pending U.S. patent application Ser. No. 11/127,979, filed on May 12, 2005, now allowed, the entire disclosure of which is hereby incorporated by reference herein.

FIELD OF THE INVENTION

The present invention relates generally to wireless media players and related systems. More particularly, the present invention relates to a wireless media system and player having improved features for establishing wireless connectivity with various electronic devices.

BACKGROUND OF THE INVENTION

The ever increasing speed and the reduced size of electronic components has contributed to the proliferation of consumer electronic devices capable of processing digital media such as audio, video, images, animation, presentations, and other content. Handheld media players include for example, cellular phones, personal digital assistants (PDAs), MP3 players, video players, game players, cameras, radios, televisions, CD/DVD players, Personal Video Recorders (PVRs), etc. Many existing media players are able to store large amounts of digital content, wirelessly connect to the Internet and exchange data over short ranges with other electronic devices.

It is often desirable to interact on a frequent basis with multiple electronic devices that contain different types of digital media. For example, users might have digital music stored in a pocket-size MP3 player, photos or video stored in a cellular phone, presentations stored in a personal digital assistant (PDA), or a variety of other digital media and applications stored on other portable electronic devices. The standardization of file formats for a variety of media types and the resulting availability of processing support for these media types has allowed users to transfer and share digital information between devices more readily.

A problem remains in that getting personal electronic devices to communicate with one another in order to transfer or access information is typically a cumbersome and time-consuming process. In some cases, a direct physical connection must be established between two devices prior to and during data transfer or access using, for example, a docking station interface, FireWire connector, Universal Serial Bus (USB) connector, or some type of cable. All of the above connectivity methods impose difficulties in that the devices must be directly attached or tethered to one another while communicating.

In other instances, connectivity between devices can be established using infra-red capability integrated into the devices. A major short-range infra-red (IR) communications network protocol, defined by the Infra-red Device Association (IrDA), is known as the IrDA standard. Infra-red technology restricts mobility by requiring the devices to be in direct line-of-sight to each other's infra-red port.

Wireless connectivity offers the most flexible means by which to connect devices and exchange information. Short-range wireless capability using standards such as Bluetooth, 802.11a, 802.11b, 802.11g, Ultra-Wideband (UWB), and others are presently being integrated into media player devices. Wireless technology obviates the need for peripherals such as docking stations, cables, and adapters and provides for mobility within a certain range.

However, one issue with wireless device-to-device connectivity is that some form of user configuration is typically required. For example, communication settings, software settings, security settings, and other information is typically required to be exchanged between and among the devices which are to communicate. In most cases, user configuration in this manner makes data exchange between the media devices insecure and time consuming. Known over-the-air techniques for configuration between two devices have also proven to be generally insecure.

As devices such as cellular phones, PDAs, MP3 players, and cameras and other handheld devices capable of storing and playing media become more prevalent and offer more and more features, it is increasingly desirable to provide interconnection between these devices for convenience and to take advantage of the rich feature sets available. Accordingly, there is a need in the art for an improved method, apparatus, and system for wirelessly connecting these devices and discovering each others' communication, media processing, and other capabilities. There is a further need for a solution that allows for the automatic establishment of a secure wireless connection between a source device and a target device and the automatic transmission of certain media assets to the target device. There is also a need for a solution that allows wireless media player devices to connect with and transmit media assets to other devices via the Internet.

SUMMARY OF THE INVENTION

It is therefore a primary object of the present invention to provide a system and methodology which improves upon prior art systems and methodologies and their related drawbacks as described above.

It is another object of the present invention to provide an efficient, user-friendly and automated methodology by which two or more devices can establish wireless communication and make each other aware of device capabilities, available media types, communication protocols and other information specific to the devices and the content stored thereon.

It is another object of the present invention to use Radio Frequency Identification (RFID) to automatically setup and establish a wireless connection between at least one source device and one target device.

These and other objects of the present invention are obtained through the use of a novel wireless media player system and related methodology. The wireless media system of the present invention includes a handheld media player (source device) capable of transmitting and receiving information over a wireless connection with other electronic devices (target devices). In one embodiment, the media player is able to simultaneously communicate with multiple target devices in close proximity using one or more supported short-range wireless protocols. In another embodiment, the media player may connect with one or more target devices through the Internet or another network, by connecting to a cellular network or a local wireless access point.

The media player of the present invention preferably includes integrated Radio Frequency Identification (RFID) technology. More specifically, the media player includes an RFID Tag-Reader Module that is capable of functioning as both an RFID tag and an RFID reader. According to a preferred embodiment, the RFID Tag-Reader Module allows interoperability with all RF 13.56 MHz readers and tags compatible with existing international standards, including ISO 14443 A/B, ISO 15693, FeliCa™, and NFC.

The RFID Tag-Reader Module also preferably includes an RFID Tag-Reader Controller that manages all communication between the media player's CPU and the RFID Tag-Reader Module's functional components. In addition to the hardware interface between the media player's CPU and the RFID Tag-Reader Controller, an application program interface (API) layer supports communication between applications operating on the terminal and the RFID module. An RFID activation button may be integrated in the media player. This activation button is capable of activating the reader functionality of the RFID Tag-Reader Module when pressed.

The invention relates, in another embodiment, to a method of using RFID to capture the media processing capability and other parameters of a target device in order to customize certain menu options and software settings in the media player. The method includes for example, recognizing the media processing capability of the target device, and customizing the user interface on the media player so that it only displays media categories and files that could be processed by the target device if transmitted.

The invention relates, in another embodiment, to a method of using the RFID connector system to quickly establish a wireless communication link with a target device and automatically transmitting certain media assets to it once connectivity has been established. The method includes, in one embodiment, automatically transmitting media which is being viewed/played on the media player at the time of an RFID exchange with the target device.

The invention relates, in another embodiment, to a method of transmitting media to a target device for viewing or listening, and using controls on the media player, or software operating therein, to alter the viewing/listening experience on the target device. The method includes, for example, transmitting audio or video from the media player to the target device, and using, the "play", "pause", "fast forward", "rewind", "stop", "skip back", and "skip forward" keys on the media player to adjust the viewing/listening experience of the media being transmitted and presented on the target device.

The invention relates, in another embodiment, to a method of creating, storing, and accessing profiles for target devices that have previously exchanged communication settings, media processing capabilities, and other information with the media player. Profiles can be used to establish automatic connectivity between the media player and one or more target devices that are in proximity via a common short-range wireless communication protocol. The method includes, receiving device information, communication settings, media processing capabilities, and other parameters associated with the target device and using the information to establish a profile for the target device on the media player. The device profile can be enabled at the user's option to automatically detect the target device when within a certain proximity to the media player. At that point wireless connectivity between devices can be automatically established. Alternatively, the profile could also be used to manually establish wireless connectivity with a target device at the user's discretion.

The invention relates, in another embodiment, to a method of selecting one or more Internet-connected target devices for the delivery of certain media assets. The method includes, selecting a media source, selecting specific media assets, selecting an address for the target device, resolving the address to an Internet routable address, and establishing a peer-to-peer communication session with the target device over the Internet.

These and other advantages and features of the present invention are described herein with specificity so as to make the present invention understandable to one of ordinary skill in the art.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a left-side perspective view of a media player terminal, in accordance with one embodiment of the present invention.

FIG. 3B is a back-side perspective view of a media player terminal, in accordance with one embodiment of the present invention.

FIG. 3C is a top-side perspective view of a media player terminal, in accordance with one embodiment of the present invention.

FIG. 3D is a bottom-side perspective view of a media player terminal, in accordance with one embodiment of the present invention.

DETAILED DESCRIPTION OF THE INVENTION

Figure 1:
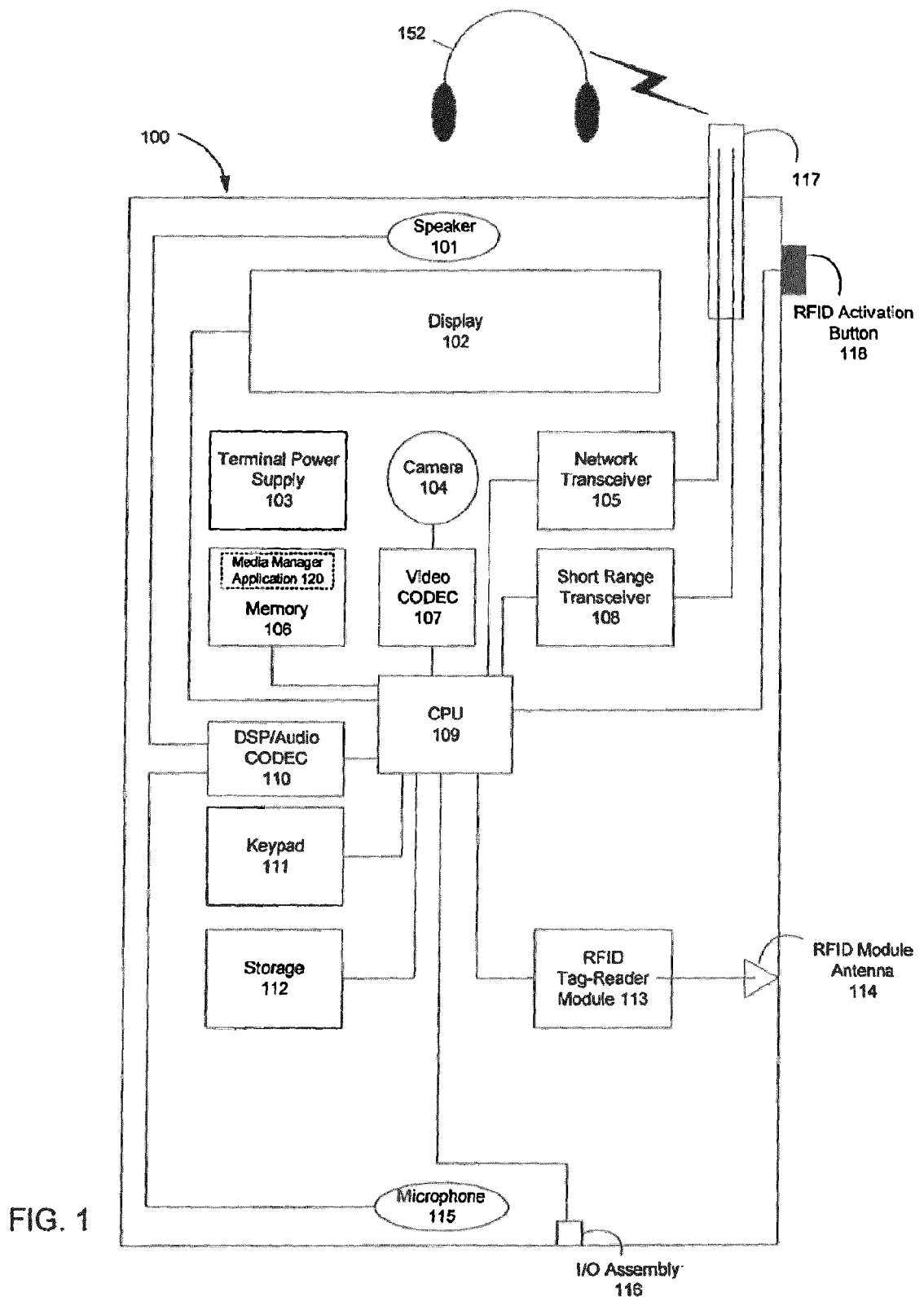
FIG. 1 is a functional representation of media player terminal interfacing with a wireless headphone unit, in accordance with one embodiment of the present invention.

The present invention for a media player system, apparatus, and method is now described in specific terms sufficient to teach one of skill in the practice the invention herein. In the description that follows, numerous specific details are set forth by way of example for the purposes of explanation and in furtherance of teaching one of skill in the art to practice the invention. It will, however, be understood that the invention is not limited to the specific embodiments disclosed and discussed herein and that the invention can be practiced without such specific details and/or substitutes therefore. The present invention is limited only by the appended claims and may include various other embodiments which are not particularly described herein but which remain within the scope and spirit of the present invention.

One important feature of the present invention is the use of RFID technology to establish wireless communication between a diverse set of devices. The methods by which RFID tags and RFID readers interact and communicate are well established and documented. The rising use of RFID technology, especially 13.56 MHz technology, for electronic payments and other applications has promoted standardization efforts to establish a broadly applicable communications framework between RFID tags and RFID readers.

One such standard was established by European Computer Manufacturers Association (ECMA) International based in Geneva, Switzerland, and is known as the Near Field Communication standard (ECMA-340). The Standard defines communication modes for Near Field Communication Interface and Protocol (NFCIP-1) for use with RFID tags and readers. It also defines both the Active and the Passive communication modes of Near Field Communication Interface and Protocol (NFCIP-1) to realize a communication network using Near Field Communication devices for networked products and also for consumer equipment.

This Standard specifies, in particular, modulation schemes, codings, transfer speeds, and frame format of the RF interface, as well as initialization schemes and conditions required for data collision control during initialization. Furthermore, this Standard defines a transport protocol including protocol activation and data exchange methods. NFC is also compatible with the broadly established contactless smart card infrastructure based on ISO 14443 A, as well as the Sony FeliCa™ protocol. This allows electronic devices with integrated NFC technology to perform multiple functions such as acting as an electronic key or wallet.

NFC can be used as a setup tool for quickly establishing wireless communication between two devices, acting as a virtual connector. Bringing two electronic devices with NFC technology into close vicinity allows the devices to automatically exchange communication settings and other information in complete security via RF signaling. This exchange of information via short-range RF allows the devices to quickly configure and establish a connection via Bluetooth or other wireless protocols supported by both devices. As discussed below, in one embodiment of the present invention, NFC may be used in connection with the teachings presented herein for establishing and maintaining communication between and among a wide variety of electronic devices.

A general discussion of the present invention is now provided and is thereafter followed by a detailed description of each of the components and functions of the invention according to specific preferred embodiments.

FIG. 1 is a functional representation of the components in a media player 100 with cellular phone capability, in accordance with one embodiment of the present invention. The term "media player" generally refers to electronic devices that are capable of processing media such as audio, video, images, presentations, animation, and Internet content, as for example, cellular phones, personal digital assistants (PDAs), music players, game players, video players, cameras, and the like. In some cases, these media players are single-functionality devices (e.g. a media player dedicated to playing digital video) and in other cases these media players are multi-functional devices (e.g. a media player that is capable of playing music, displaying video, presenting images, and the like). In either case, these devices are generally portable so as to allow a user to, for example, listen to music, play video, take pictures, and engage in multi-player gaming without the need for a wired connection to some other electronic device. It should not be presumed for purposes of the following description that the term "media player" necessarily refers to a device which is capable of playing a particular media.

In the illustrated representation of FIG. 1, media player 100 is a pocket sized device that allows a user to process and store a large collection of digital audio/music, video, images, presentations, animation, Internet content, and other types of media. Media player 100 is capable of processing these media types using functionality integrated in its resident operating system. In an alternate embodiment, media processing is handled by a separate application which operates on the device 100, such as media manager application 120. The media manager application 120 allows incoming or resident media to be "played", "viewed" or otherwise manipulated on the media player 100 and also allows for the transmission of media assets to other devices in proximity via short-range RF or via the Internet. The media manager application 120 also performs other media processing functions, as described below, such as dynamically converting media file formats, providing control functionality for adjusting the viewing/listening attributes on the media player 100 or a target device, organizing media assets into categories so they can be easily located, and providing a search engine for locating specific media assets using a variety of attributes. As mentioned above, the media manager functionality can be integrated with the operating system operating on the device 100 while still remaining within the scope and spirit of the invention. Media player 100 may also include additional functionality for placing phone calls, video teleconferencing, recording audio/video, taking pictures, storing a calendar, establishing a phone list/directory, storing and executing multi-player network games, text/media messaging, accessing/browsing the Internet, facilitating computations using a calculator, transacting at a point-of-sale location using a digital wallet application and the RFID capability of the player 100, completing e-commerce transactions over-the-air, and the like. Media player 100 also provides the user with optional password security in order to protect confidential information stored in the device. In another embodiment, an integrated biometric fingerprint reader provides enhanced security for protecting the media player 100 against unauthorized use.

Media player 100 includes a casing that encloses various internal electrical components (including integrated circuit chips and other circuitry) that provide computing operations for the media player 100. In addition, the casing may also define the exterior shape, form, and color of the media player. The integrated circuit chips and other circuitry contained within the housing may include a microprocessor (e.g., CPU 109), memory (e.g., ROM, RAM, flash) 106, a rechargeable power supply 103 (e.g., rechargeable lithium polymer battery), a circuit board, a hard drive 112, and various input/output (I/O) support circuitry 116. The input/output (I/O) assembly 116 allows Media Player 100 to connect to a docking station, or connect to other devices/peripherals via a FireWire port, USB port, PS/2 port, serial port, parallel port, network interface port, infrared (IR), audio jack, video jack, and the like. The I/O assembly 116 is generically shown in FIG. 1 since the media player 100 could employ a wide variety of connector/port options for interfacing with external hardware. Multiple connector/port types could be integrated into media player 100.

As shown in FIG. 1, media player 100 includes a microprocessor 109 configured to execute instructions and to carry out various operations. In most instances, microprocessor 109 executes instructions under the control of an operating system or other software (e.g., media manager). The processing function in media player 100 can also be performed by dual-processor chips or multi-processor chips for higher performance.

The electrical components contained within media player 100 may also include components for inputting or outputting audio such as a speaker 101, microphone 115, and an amplifier and a digital signal processor (DSP) 110. Media player 100 may further comprise additional components for capturing images such as camera 104 (e.g., charge coupled device (CCD) or complimentary oxide semiconductor (CMOS)) or optics (e.g. lenses, splitters, filters). Similarly, media player 100 may also include components for sending and receiving media (e.g. antenna 117, and transceivers 105 and 108, etc.).

As shown in FIG. 1, media player 100 includes a display screen and related circuitry 102 for displaying a graphical user interface that allows the user to interact with the device. The display screen 102 also allows a user to visually see data input into terminal via keypad 111 and other information (e.g., video, images, text, objects). By way of example, the display screen 102 may be a liquid crystal display (LCD). In one particular embodiment, the display screen is a high-resolution color display that provides visibility in daylight as well as low-light conditions. The display screen 102 supports "touch-screen" data input using a stylus or other object.

A short-range transceiver 108 and antenna 117 provide wireless connectivity with external devices or access points using supported communications protocols (e.g., Bluetooth, 802.11a/b/g/n, Ultra Wideband, Wireless USB, 802.15.3/WiMedia, Wireless 1394, Wireless FireWire, WiMax, and 802.1 5.4/ZigBee). The short-range transceiver 108 and antenna 117 system also support broadcast standards such as AM, FM, UHF, VHF, and HDTV. Support for these broadcast standards allows the media player 100 to receive and broadcast radio and television signals over a short-range.

The short-range transceiver 108 and antenna system 117 are specifically designed to support the widest array of communication protocols and broadcast standards in order to allow the media player 100 to establish communication with a multiplicity of devices now available or which later become available. The short-range transceiver 108, antenna system 117, and other components within media player 100, are also designed to allow for the simultaneous communication with multiple devices, and using multiple communication standards and broadcast standards.

The antenna used in short-range communication is not the same antenna used in communication with a wide area cellular network, and as such are represented in FIG. 1 separately, but are enclosed in the same antenna assembly 117. As such, generic references to antenna 117 may refer herein to the short-range transceiver antenna or the network transceiver antenna. The antenna assembly 117 is represented in FIG. 1 and may extend out from the main body of the media player 100. However, in a preferred embodiment the actual antenna system 117 in media player 100 is enclosed within the casing of the media player 100.

A receiver for satellite-based Digital Audio Radio Services (DARS) could also be integrated in the media player 100. The receiver allows the device 100 to receive programming in the "S" band (2.3 GHz) spectrum, broadcast by companies such as XM and Sirius.

Short-range transceiver 108 interacts with a CPU 109 for implementing short-range communications protocols and processing messages exchanged between other electronic devices and the media player 100. CPU 109 is linked to a volatile or dynamic random access memory (DRAM) 106. CPU 109 executes programs stored in a non-volatile or read only memory 106 and provides instructions for managing and controlling the operating of media player 100. CPU 109 is also connected to network transceiver 105 for interacting with a cellular network, such as a Global System Mobile (GSM) network and the like via antenna 117. Media player 100 is able to access the Internet through the cellular network, or through a wireless access point using short range transceiver 108 and a supported communications protocol (e.g., WiFi).

In one embodiment, media player 100 functions as a wireless terminal that has one or more E.164 phone numbers, Uniform Resource Identifiers (URIs), or other types of unique addresses that can be resolved over the Internet associated with it. Media player 100 may also have a built in TCP/IP stack that supports communication over Internet Protocol (IP)-based networks. Preferably, media player 100 supports both the IPv4 and IPv6 network addressing schemes.

In accordance with the invention, media player 100 includes a Session Initiation Protocol (SIP) application stack for multimedia communication over the Internet. Media player 100 preferably also supports other application layer protocols such as H.323, Real-time Transport Protocol (RTP), HTTP, SMTP, FTP, DNS, and DHCP.

In accordance with a preferred embodiment of the invention, media player 100 is fully compliant with 3GPP and 3GPP2 standards. 3GPP and 3GPP2 are worldwide standards for the creation, delivery and playback of multimedia over 3rd generation, high-speed wireless networks. Defined by the 3rd Generation Partnership Project and 3rd Generation Partnership Project 2 respectively, these standards seek to provide uniform delivery of rich multimedia over newly evolved, broadband mobile networks (3rd generation networks) to the latest multimedia-enabled devices, such as media player 100.

In accordance with the invention, an RFID Tag-Reader Module 113 is integrated into media player 100. RFID Tag-Reader Module 113 is provided so that, among other things, media player 100 can rapidly exchange information with an electronic device that is in close proximity and which also has integrated RFID technology. Information exchanged between media player 100 and a target device via RFID can allow for the fast and automatic set-up of wireless connectivity between media player 100 and various target devices. As previously stated, RFID Tag-Reader Module 113 can also be used in connection with other applications available through media player 100 such as electronic payments at the point-of-sale and secure key access to buildings, cars, etc.

RFID Tag-Reader Module 113 is connected to CPU 109. RFID Tag-Reader Module 113 comprises a radio frequency ID transponder which conforms to the principals of RFID technology and known standards. The RFID Tag-Reader Module 113 also includes a reader component used for transmitting interrogation signals via its antenna to an external electronic device's RFID tag when in close proximity, and receiving a response signal from the external device's RFID tag. RFID Tag-Reader Module 113 uses media player's 100 internal power supply 103 as a power source for transmitting interrogation signals to a target device.

In accordance with one embodiment of the invention, media player 100 has an integrated RFID activation button 118 which is visible on the exterior of the device. RFID activation button 118 is shown separately from the generic keypad components 111 shown in FIG. 1 in order to highlight its specific function versus other buttons/controls which are incorporated in media player 100. RFID activation button 118, like all other keypad 111 components, interfaces with CPU 109. When RFID activation button 118 is pressed, CPU 109 signals RFID Tag-Reader Module 113 to disable its RFID tag component and activate its reader component in order to transmit interrogation signals to one or more target devices. In one embodiment, this condition is maintained for as long as RFID activation button 118 remains depressed. In an alternative embodiment, RFID activation button 118 can be pressed and immediately released, and the condition of the disabled RFID tag and activated reader is maintained until such time the reader sends interrogation signals and receives a response from a target device. Upon receiving a response, RFID Tag-Reader Module 113 returns to its normal state whereby the RFID tag component is active (and awaiting an interrogation signal), and the RFID reader component is disabled. Yet another possible embodiment for the function of RFID activation button 118 is wherein the reader function is activated and the tag function is disabled for some predetermined length of time following the pressing of button 118 after which time, RFID Tag-Reader Module 113 reverts to its normal operation mode.

According to one important aspect of the present invention, RFID Tag-Reader Module 113 and RFID activation button 118 can be used together, with the media manager application 120 operating on media player 100 as a virtual connector system for automatic setup and establishment of a wireless connection with one or more target devices, and transmission of certain media assets.

While media player 100 can also connect headphones and speakers via I/O assembly 116, media player is particularly well suited to interface with wireless sound output devices such as wireless headphone unit 152 in FIG. 1. Media player 100 can wirelessly transmit audio signals via short range transceiver 108 to one or more devices that support a common communications protocol.

Figure 2A:
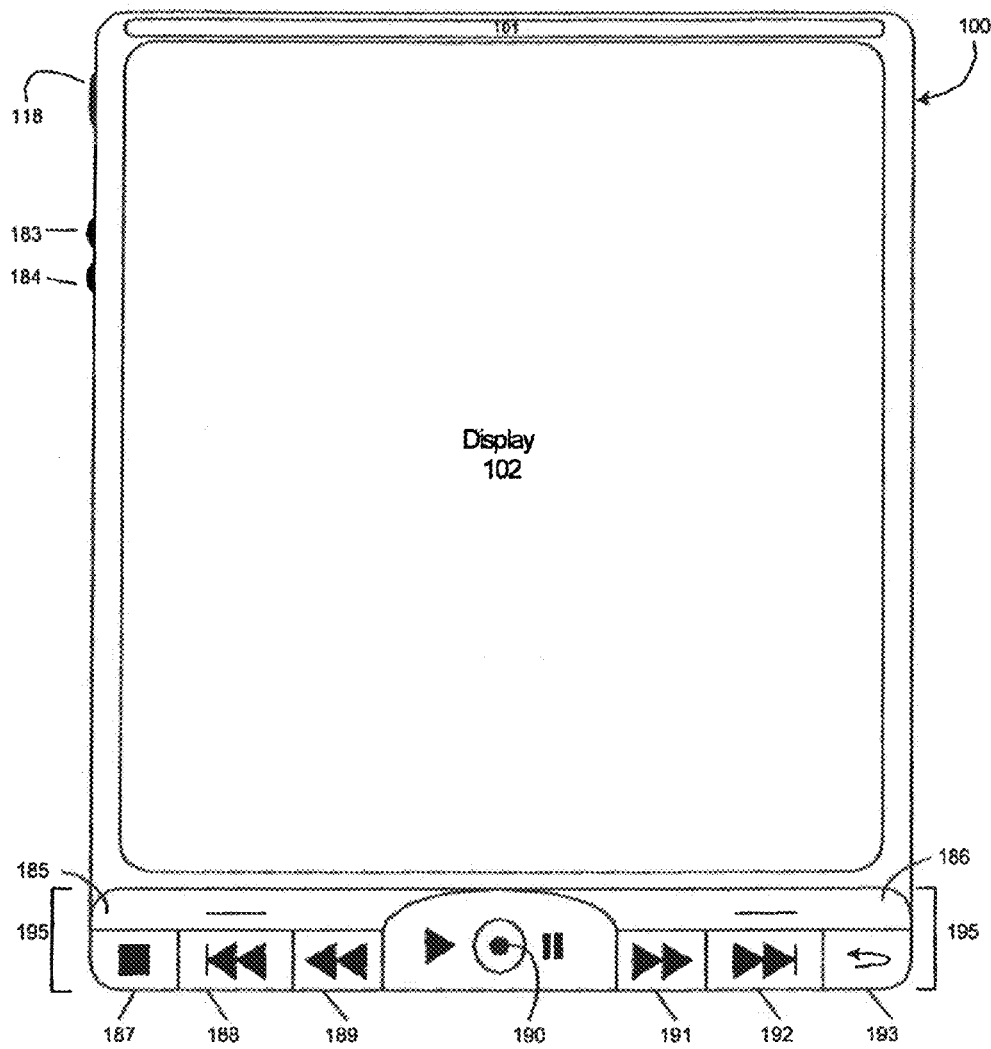
FIG. 2A is a front-side perspective view of a media player terminal, in accordance with one embodiment of the present invention.

FIG. 2A is a front-side perspective view of media player 100 in accordance with one embodiment of the present invention. Media player 100 has a large high-resolution color display screen 102 which takes up substantially most of the surface space on the front-side of media player 100.

According to one embodiment, on the left-side of media player 100, are placed a set of integrated buttons. For example, RFID activation button 118 (discussed above) is shown at the top left. Below it are two volume control buttons 183 and 184 for adjusting audio output from the player's integrated speaker system 101 or an external audio output device connected to media player 100. The top volume control button 183 is for increasing sound volume, and the bottom button 184 is for lowering the sound volume.

Multiple speakers 101 integrated in player 100 offer a rich surround sound capability. In one embodiment, speakers 101 are situated at the top of the media player terminal, and provide audio output through an opening that extends from the top left of the unit to the top right. Digital audio processor 110 in media player 100 supports Dolby™ and THX™ audio technologies.

Also present at the bottom of media player 100 is the keypad interface 195 used to interact with the operating system and software loaded in media player 100. Keypad interface 195 buttons are configured to provide control for making selections or issuing commands associated with operating the media player 100. Contained in the keypad interface 195 at the bottom are two buttons 185 & 186 used for selecting options that appear directly above the respective buttons in display screen 102 and graphical user interface (known sometimes as "soft keys"). At the center of keypad interface 195 is a miniature joy stick 190. Joy stick 190 can be pressed down as a button and used as a way to make menu selections in connection with the graphical user interface.

Joy stick 190 may also function as a play/pause button when used in the same manner with the media manager application 120. Joy stick 190 can also be used to navigate menus by leaning the stick upwards, downwards, to the right, or left in order to make certain selections. Also contained in the key pad interface 195 is a "stop" button 187, which stops the playback of the current media asset. The "skip back" button 188 returns to the beginning of the current media asset, or if at the beginning, returns to the beginning of the previous media asset. The "rewind" button 189 rewinds the current media asset; when the rewind button is released, the media manager application 120 begins playing the current media asset. The "fast forward" button 191 advances forward through the current media asset. When the "fast forward" button is released, the media manager application 120 begins playing the current media asset. The "skip forward" button 192 begins playing the beginning of the next media asset in the list. The "back" or "previous screen" button 193 takes the user to the screen that was previously displayed. The "rewind" button 189 can also be used to delete characters that may have been input to the device when in text mode. Pressing the "fast forward" button 191 or leaning the joy stick 190 to the right can also be used to create a "space" when in text mode. The keypad interface 195 can be used to control the viewing of audio, video, images, presentations, or other media assets on the media player terminal 100.

The above description with respect to particular layouts of the device and the location and presence of various buttons and control elements is merely exemplary. It will be readily understood that a virtually limitless number of alternatives may be used while still remaining within the scope and spirit of the present invention. For example, the position of display screen 102 and the key pad interface 195 may be widely varied. The shape of display screen 102 may also be varied. The shape of the buttons represented may also be varied. In addition to the above, there could be other buttons or features which provide additional control functions. For example, media player 100 may include additional switches, keys, trackballs, touch pads, touch screens, and the like.

Figure 2B:
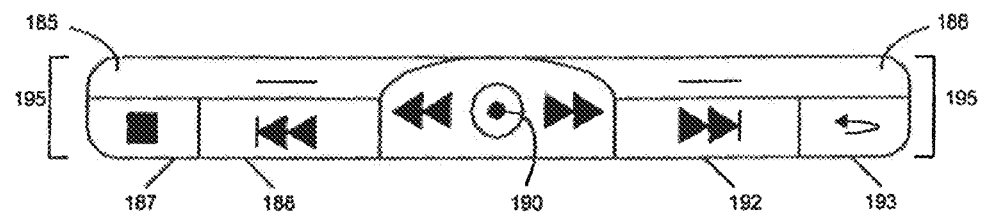
FIG. 2B is a representation of the keypad interface of a media player terminal, in accordance with another embodiment of the present invention.

FIG. 2B is a representation of an alternate keypad interface 195 design for media player 100 in accordance with one embodiment of the present invention. In this embodiment, the play/pause functionality still resides with joy stick 190 at the center of key pad interface 195. Joy stick 190 can be pressed as a button and used as a way to make menu selections, and also function as a play/pause key when used in this manner. Leaning joy stick 190 to the right can provide a "fast forward" capability when manipulating media assets like audio or video files. Similarly, leaning joy stick 190 to the left can provide a "rewind" capability when manipulating audio or video assets. Other buttons represented in FIG. 2B have similar functionality to buttons contained in FIG. 2A.

Figure 2C:
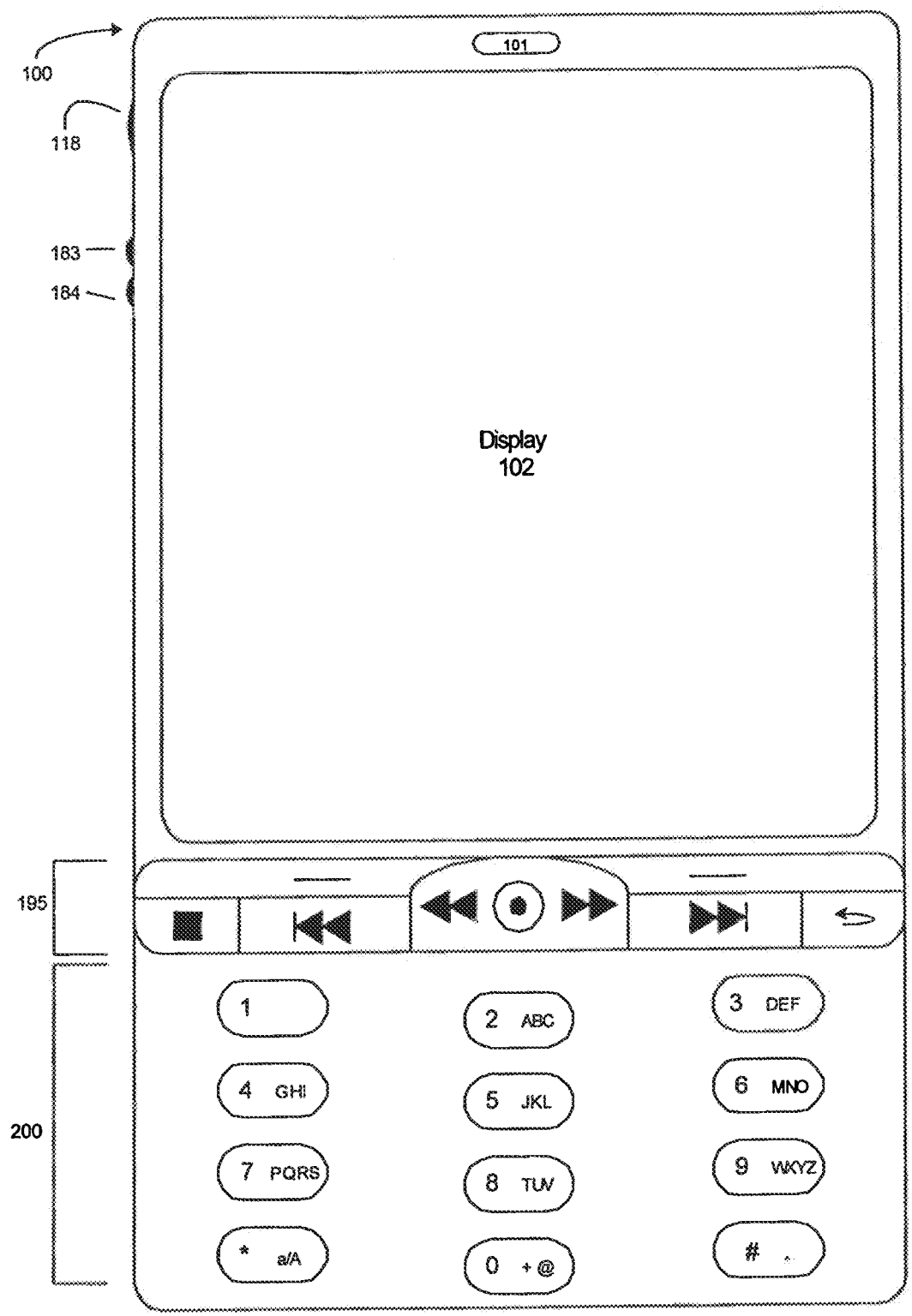
FIG. 2C is a front-side perspective view of a media player terminal with an alpha-numeric keypad, in accordance with one embodiment of the present invention.

FIG. 2C is a front-side perspective view of a media player 100 with an alpha-numeric telephone keypad 200 in accordance with one embodiment of the present invention. Media player 100 has an integrated key pad interface 195 as previously represented in FIG. 2B for controlling media assets while using the media manager application, and providing other software navigation functionality. Key pad interface 195 represented in FIG. 2C could, in an alternate embodiment, be the key pad interface 195 that is represented in FIG. 2A. Below key pad interface 195 in FIG. 2C is an alpha-numeric telephone keypad 200 similar to ones found on most cellular and fixed line telephones. Incorporating alpha-numeric key pad 200 into another embodiment of the device would require the use of a smaller display screen 102 in order make media player 100 illustrated in FIG. 2C a pocket-size device. In another embodiment, alpha-numeric key pad 200 could be replaced with a QWERTY keyboard interface similar to those found on Blackberry™ type devices made by Research In Motion (RIM). Regardless of whether media player 100 has a physical alpha-numeric keypad or QWERTY keyboard, the device preferably includes a software-based QWERTY keyboard which is displayed in the graphical user interface and allows data input using joy stick 190 or the touch-screen display 102.

FIG. 3A is a left-side perspective view of media player 100, in accordance with another embodiment of the present invention. At the top is RFID activation button 211. Below are two volume control buttons 212 and 213. The button with the "plus sign" 212 is for increasing sound volume, and the button with the "minus sign" 213 is for lowering the volume of sound output.

FIG. 3B is a back-side perspective view of media player 100, in accordance with another embodiment of the present invention. At the top of the back-side is an RFID "hot spot" 221. RFID "hot spot" 221 is a marked area representing the location of RFID Tag-Reader Module antenna 114. RFID "hot spot" 221 is marked to allow a user to know which area of the media player 100 to position over an RFID "hot spot" on a target device to which wireless connectivity is desired.

In one embodiment, RFID "hot spot" area 221 appears in a different color than the rest of the terminal casing, and is labeled with a symbol that users recognize as being the location of the RFID Tag-Reader Module antenna 114. Also situated on the back-side of media player 100 may be camera lens 223 and flash 225 for video capture and digital photography. Preferably, the camera lens and related apparatus in the media player 100 is capable of supporting very high-resolution imaging.

FIG. 3C is a top-side perspective view of media player 100, in accordance with another embodiment of the present invention. RFID "hot spot" 221 previously described could be positioned on any side and in any area of media player 100. FIG. 3C shows RFID "Hot Spot" 221 being on the top-side of media player 100. Next to RFID "Hot Spot" 221 is a power button 231 for switching the power to the media player 100 "on" or "off".

FIG. 3D is a bottom-side perspective view of the media player 100, in accordance with another embodiment of the present invention. Located on the bottom of the device is a microphone 245 for audio input. Also situated on the bottom of the terminal is a data and power port 248. The data port may use any connector/port interface previously mentioned for interfacing with other electronic devices. Also included is a power port that receives a power plug or car charger plug for delivering power and charging the media player's internal battery 103.

Figure 4A:
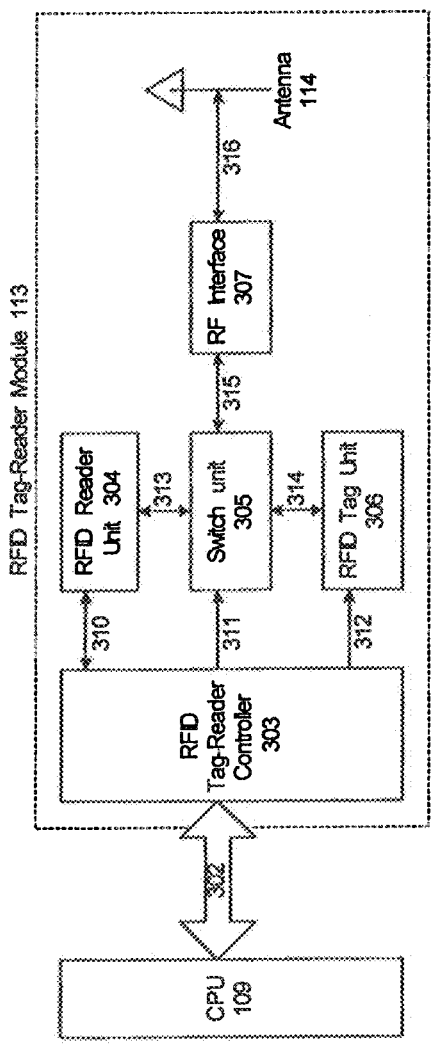
FIG. 4A depicts a functional diagram illustrating one embodiment of a RFID tag-reader module according to the invention.

FIG. 4A is a functional diagram illustrating one embodiment of a RFID Tag-Reader Module 113 according to the invention. It is assumed that the RFID Tag-Reader Module 113 as embodied in FIG. 4A is attached to or embedded within media player 100.

RFID Tag-Reader Module 113 is capable of functioning as both an RFID tag and an RFID reader. In accordance with the invention, RFID Tag-Reader Module 113 allows interoperability with RF 13.56 MHz readers and tags compatible with existing international standards, including ISO 14443 A/B, ISO 15693, FeliCa™, and NFC. Compatibility with these standards gives media player 100 the ability to not only establish a wireless connection with other electronic devices using RFID for setup as earlier described, but also allows media player 100 to function as an electronic key and wallet (for point-of-sale transactions). Alternative protocols and frequencies may be used in connection with RFID Tag-Reader Module 113 while still remaining within the scope and spirit of the present invention.

With reference to FIG. 4A, RFID Tag-Reader Module 113 includes an integrated RFID Tag-Reader Controller 303 that manages all communication between CPU 109 and the functional components of RFID Tag-Reader Module 113. The hardware and software interface 302 between CPU 109 and RFID Tag-Reader Controller 303 allows an application operating on media player 100 to control functions of RFID Tag-Reader Module 113 and to exchange data with it. In addition to the appropriate hardware interface, an application program interface (API) layer supports communication between applications operating on media player 100 and RFID Tag-Reader Module 113. RFID Tag-Reader Controller 303 may also provide notification to CPU 109 of unsuccessful read attempts by RFID Tag-Reader Module 113, successful read attempts, reader time-outs (as discussed below), and other possible results or actions associated with RFID Tag-Reader Module 113. These notifications are delivered to CPU 109 via the hardware and software interface 302 in order to allow media player 100 to emit distinctive sounds/tones via its integrated speaker 101 or display specific messages when these and other actions occur.

In one embodiment (FIG. 4A), RFID Tag-Reader Controller 303 interfaces with RFID reader unit 304, a switch unit 305, and RFID tag unit 306.

The FIG. 4A version of RFID Tag-Reader Module 113 includes RFID reader unit 304 which represents the RFID tag reader functionality and RFID tag unit 306, which represents the RFID tag functionality. The embodiment illustrated in FIG. 4A includes a common RF interface 307 and a common antenna 114 used by both RFID reader unit 304 and the RFID tag unit 306. It will be understood that radio frequency interface 307 as well as the antenna 114, which are presented in the present description, are adaptable to employ any suitable radio frequency used in the field of RFID readers and tags while still remaining within the scope and spirit of the invention. RFID-Tag Reader Module 113 may be adapted, for example, to allow communication in passive and active communication modes with reading/writing functionality in accordance with the near field communication standard (ECMA-340). Antenna 114 can be adapted to communicate with an RFID tag and with another RFID tag reader device.

RFID Tag-Reader Module 113 comprises a switch 305, which operates to switch between RFID reader functionality and RFID tag functionality. Switch 305 receives a switching signal from RFID Tag-Reader Controller 303 to which it connected via interface 311. RFID Tag-Reader Controller 303 receives the switching signal from CPU 109 when an application operating on media player 100 requires RFID Tag-Reader Module 113 to switch functionality. The RFID Activation button 118 described above may also be used to switch RFID Tag-Reader Module 113 functionality.

Depending on the switching state or position of switch 305, either RFID reader unit 304 is coupled to RF interface 307 or RFID tag unit 306 is coupled to RF interface 307. In the former case, RFID reader functionality is available, whereas in the latter case RFID tag functionality is available. As the RFID reader functionality utilizes the media player's 100 battery power in order to transmit interrogation signals, switching the RFID reader functionality "on" only when desired has the benefit of conserving the media player's 100 battery. In contrast, when the tag functionality is switched "on", the media player 100 does not consume battery power as it is waiting for an interrogation signal from another device.

When RFID activation button 118 on the media player 100 is pressed, CPU 109 sends a switching signal to RFID Tag-Reader Controller 303 to change the position of switch 305. RFID Tag-Reader Controller 303, in turn, signals switch unit 305 to change positions via interface 311. While RFID activation button 118 is held pressed, the RFID reader functionality is switched on while the RFID tag functionality is disabled. Holding RFID activation button 118 down provides the necessary power for RFID reader unit 304 to transmit one or more interrogation signals and to receive one or more response signals from an RFID tag (associated with an external electronic device) that is within range of antenna 114.

When RFID activation button 118 is released, CPU 109 sends a switching signal to RFID Tag-Reader Controller 303 to change the position of switch 305 back to its original state. RFID Tag-Reader Controller 303, in turn, sends a message to switch unit 305 via interface 311 to change positions. This time the RFID tag functionality is switched on while the RFID reader functionality is disabled. The use of RFID activation button 118 in this manner serves to conserve power for media player 100, while making RFID reader 304 functionality readily accessible.

According to another embodiment of the invention, RFID activation button 118 can be pressed and immediately released in order to activate the reader functionality as previously described. In this case, the reader may continue sending interrogation signals via antenna 114 until a response is received (from a target device), or until such time as the reader functionality times-out (without having received a response). In this embodiment, RFID Tag-Reader Controller 303 tracks, via an internal clock, the time that has elapsed before a pre-set time-out limit is achieved. If an interrogation response is received within the time limit or if the reader times-out without receiving a response signal, RFID Tag-Reader Controller 303 will signal switch unit via interface 311 to switch functionality. This results in RFID Tag-Reader Module 113 reverting to its normal state whereby the RFID tag functionality is switched on while the RFID reader functionality is disabled.

Analogously, RFID Tag-Reader Module 113 may be operable with RFID reader functionality when RFID activation button 118 is pressed (as described above), or media player 100 and/or one or more applications operating thereon instruct RFID Tag-Reader Controller 303 to select/switch to RFID reader functionality.

According to another embodiment of the invention, RFID activation button 118 can be integrated into an electronic device that only includes an integrated RFID tag (and no reader). Holding RFID activation button 118 down in this case would have the effect of activating the RFID tag to respond to an interrogation signal received by its antenna from another electronic device's RFID reader. The RFID tag would only respond to an interrogation signal received by its antenna while RFID activation button 118 is held pressed. In another embodiment, pressing and immediately releasing the RFID activation button 118 may activate the RFID tag and allow it to respond to interrogation signals received by its antenna 114 within a set time limit after which time the tag returns to its normal state where it is inoperable and unable to respond to interrogation signals.

In the case of RFID reader 304 functionality, the antenna 114 is adapted to transmit one or more interrogation signals and to receive one or more response signals for retrieving information from an RFID tag in an external electronic device. In case of RFID tag functionality, antenna 114 is adequate to receive one or more interrogation signals and to transmit one or more response signals carrying information retrieved from RFID tag unit 304. Antenna 114 is connected to RF interface 307 via one or more signal connections which supplies RF/HF signals generated by RF interface 307 to antenna 114 and which accepts RF/HF signals received by antenna 114.

RF interface 307 is responsible for both modulating and demodulating the signals to be transmitted and received by antenna 114, respectively. Therefore, RF interface 307 couples to RFID reader unit 304 and RFID tag unit 306, respectively. In particular, RF interface 307 receives from RFID reader unit 304 signals to be modulated and transmitted and transmits demodulated signals to RFID reader unit 304. RF interface 307 also transmits demodulated signals to RFID tag unit 306 and receives signals from RFID tag unit 306 to be modulated and transmitted. More particularly, RF interface provides further signals necessary for the operation of RFID tag unit 306 which are comprised of a power supply signal (voltage signal) and a clock signal. The power supply signal is gained from the coupling of the interrogating electromagnetic field whereas the clock signal is obtained from the demodulator included in the RF interface. The power supply signal and the clock signal are necessary for operating RFID tag unit 306 as a passive RFID tag energized by interrogating signal of a RFID reader device.

Signal 313 is generated by RFID reader unit 304 to be modulated by RF interface 307 and to be transmitted by antenna 114. Signal 313 is also received by antenna 114 and demodulated by RF interface 307 to be supplied to RFID reader unit 304. Signal 313 is provided to switch unit 305 which interfaces with RF interface 307 via signal 315.

Signals received by antenna 114 and supplied to RFID reader unit 304, are passed to RFID Tag-Reader Controller 303 via interface 310. RFID Tag-Reader Controller 303 in turn, passes the received data to CPU 109 via interface 302 for use by applications operating on media player 100. Applications operating on media player 100 can also customize interrogation signals by sending a message to RFID reader unit 304 via RFID Tag-Reader Controller 303.

Analogously, connection 314 carries signals received by the antenna 114 and demodulated by RF interface 307 to be supplied to RFID tag unit 306. Connection 314 also carries signals generated by RFID tag unit 306 to be modulated by RF interface 307 and to be transmitted by antenna 114. Connection 314 is switched by switch unit 305 to RF interface 307 connected to switch 305 via connection 315. The aforementioned power supply signal and clock signal are supplied from RF interface 307 to RFID tag unit 306 via switch 305 and may be part of the signals transmitted via connection 316 and connection 314.

The information stored in RFID tag unit 306 that can be retrieved by an RFID reader device is stored in memory. The memory may be a read-only storage component or a configurable storage component. In case of a configurable storage component, a number of storage technologies including, non-volatile configurable memory can be used. Applications operating on media player 100 can update information stored in RFID tag unit 306 by sending the data to RFID Tag-Reader Controller via interface 302. RFID Tag-Reader Controller 303 in turn sends the new data to RFID tag unit 306 via interface 312. Access to the configurable tag memory may be limited to one or more specific applications executed on media player 100 to ensure data integrity, which may be required and necessary depending on the kind of information stored.

Figure 4B:
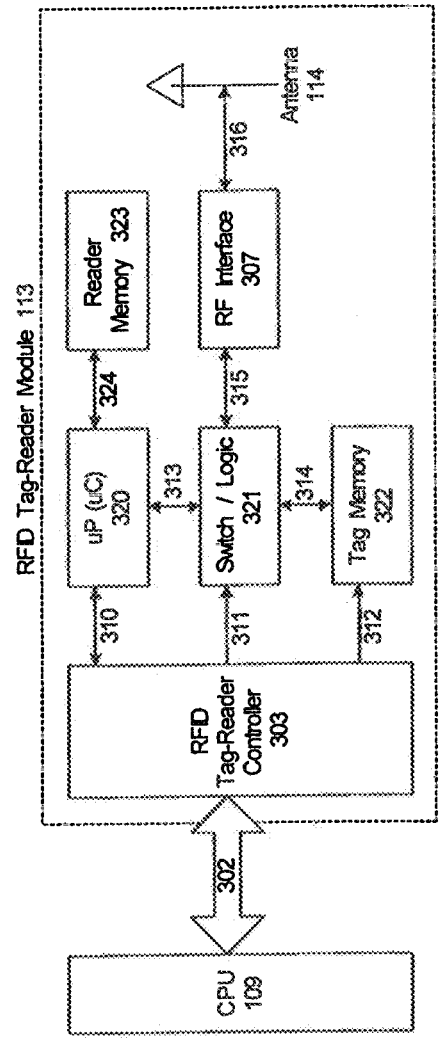
FIG. 4B depicts a functional diagram illustrating an alternative embodiment of a RFID tag-reader module according to the invention.

FIG. 4B is a block diagram illustrating an alternative embodiment of an RFID Tag-Reader Module 113 according to still another embodiment of the invention. The RFID Tag-Reader Module embodiment illustrated in FIG. 4B is comparable to the RFID Tag-Reader Module illustrated in FIG. 4A in several ways. RFID Tag-Reader Module 113 according to the embodiment in FIG. 4B, includes an integrated RFID Tag-Reader Controller 303 that manages all communication between CPU 109 and the functional components of RFID Tag-Reader Module 113. The hardware and software interface 302 between CPU and RFID Tag-Reader Controller 303 allows an application operating on media player 100 to control functions of RFID Tag-Reader Module 113 and to exchange data with it. A common RF interface 307 and a common antenna 114 are used by the RFID reader functionality and RFID tag functionality. The reader logic 320 is preferably implemented as a microcontroller (μC) and a microprocessor (μP), respectively, which provide for data communication interface to media player 100 and the application executed thereon, respectively. The reader logic operates the interface and protocol framework for communicating with RFID tags (passive communication mode) and in particular, when supporting active communication mode, for communicating with RFID tag reader devices.

An optional reader memory 323 is associated with the microcontroller (μC) and a microprocessor (μP), respectively. Conventionally, a distinct reader memory 323 is not necessary for RFID reader functionality, but reader memory 323 may be used as a buffer storage for communication with media player 100 as well as with an RFID tag or another RFID tag reader device.

A switch/logic component 321 is interposed between RF interface 307 and reader logic 320 to switch between RFID reader functionality and RFID tag functionality as described in detail above. The switch/logic component implement tag logic necessary for providing RFID tag functionality. Correspondingly, the tag memory 322 is connected to the switch/logic component 321. The tag memory 322 is also connected to the RFID Tag-Reader Controller 303 in order to receive configuration data from applications operating on media player 100.

According to the invention, memory components in RFID Tag-Reader Module 113 may be tamper resistant as to prevent hackers from retrieving confidential information and encryption keys Common RF interface 307 provides signals to the switch/logic component 321, which are required for operation of RFID reader functionality and RFID tag functionality. The switch/logic component 321 passes through signals to the microprocessor (μP) 320, which are required by the microprocessor (μP) 320. Signal control is accomplished via switch/logic component 321.

As described above, the switching state of switch/logic component 321 and the switch defines the functionality of RFID Tag-Reader Module 113, respectively. The switching state and therefore the switching operation is important to ensure proper operation of RFID Tag-Reader Module 113. The switching state of switch/logic component 321 and the switch is controlled by a switching signal supplied via the interface 311 to RFID Tag-Reader Controller 303.

RFID Tag-Reader Module 113 may be operable with RFID reader functionality when the RFID activation button 118 is pressed on media player 100 as described earlier, or if one or more applications operating thereon signal RFID Tag-Reader Controller 303 to switch to RFID reader functionality. If no explicit indication to select RFID reader functionality is present, RFID Tag-Reader Module 113 is operated in RFID tag functionality by default to conserve power.

Alternatively, switch/logic component 321 and the microprocessor (μP) 320 may be implemented in a common logic component (not shown), which is adapted to operate functions of switch/logic component 321 as well as functions of microprocessor (μP) 320. Other functional components may also be combined, while remaining within the spirit and scope of the invention.

Further details concerning an RFID Tag-Reader Module with transponder functionality which may be used in connection with the teachings of the present invention are described in U.S. Patent Application Publication US 2004/0176032A1, filed Mar. 19, 2004, which is assigned to Nokia Corporation and which is fully incorporated herein by reference. RFID Tag-Reader Controller 303 and RFID activation button 118 as described herein may be used with other RFID Tag-Reader Module designs while remaining within the scope and spirit of the invention.

Figure 5:
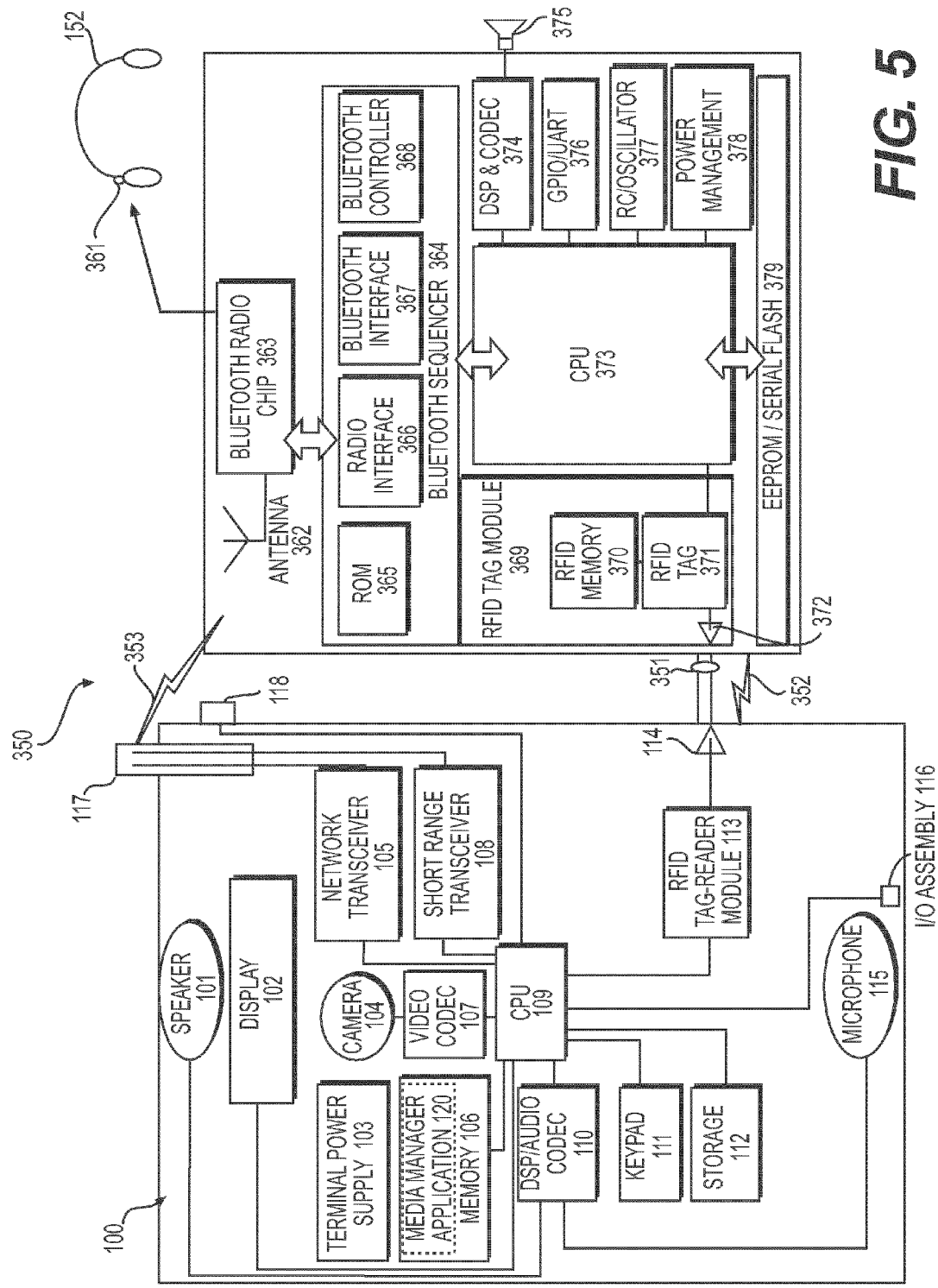
FIG. 5 is a functional diagram of a media player terminal interfacing with a wireless headphone unit, in accordance with one embodiment of the present invention.

FIG. 5 is a functional diagram of a media player 100 interfacing with wireless headphone unit 152, in accordance with one embodiment of the present invention. Media player 100 can securely establish wireless connectivity with headphone unit 152 by first initiating an RFID data exchange between the RFID components integrated in both devices. The exchange of communication settings, device information, media capabilities, and other parameters via RFID is accomplished by bringing the RFID antenna of both devices in proximity to one another. The RF exchange of communication and other settings facilitates the automatic setup and establishment of a secure wireless connection between the devices in order to allow audio signals to be transmitted over-the-air from media player 100 to headphone unit 152. The subsequent creation of a "device profile" containing the captured communication settings and other parameters associated with wireless headphone unit 152, allows media player 100 to establish connectivity with headphone unit 152 in future communication sessions.

Wireless headphone 152 in this embodiment may be a Bluetooth-enabled device with an integrated RFID tag module 369. RFID tag module 369 is a component of the System-on-Chip 361 assembly integrated in wireless headphone unit 152. System-on-Chip assembly 361 is designed for ultra low power consumption. Wireless headphone unit 152 has a rechargeable battery that can be charged using a car charger or charger unit that plugs in to a power outlet.

System-on-Chip 361 assembly includes a Bluetooth sequencer 364, a low power 2.4 GHz Bluetooth radio 363, Bluetooth antenna 363, CPU 373, DSP and CODEC unit 374, high-speed UART/GPIO 376, RC oscillator 377, power management unit 378, EEPROM/Serial Flash Memory 379, and an RFID Tag Module 369. The RFID Tag Module 369 in one embodiment includes an RFID tag 371, an RFID antenna 372, and an optional RFID tag memory component 370. The embedded Bluetooth sequencer 364 executes the lower layers of the Bluetooth stack, while the host processor 373 runs the application and the higher levels of the Bluetooth protocol stack software. This architecture guarantees that the real-time operations of the lower levels can't be influenced by the application. The Host Controller Interface (HCI) has been specified into the Bluetooth protocol as a standardized interface between the lower and upper layers. The upper layers are components of software implemented on the host processor 373 and communicating with the Bluetooth sequencer 364 through the HCI. The HCI commands are carried by an internal UART link between the host processor (CPU) 373 and the Bluetooth sequencer 364.

The on-chip DSP (Digital Signal Processing) and CODEC unit 374 is connected with the headphone speakers to facilitate high quality audio output. A Serial Peripheral Interface (SPI) directly interfaces to the serial EEPROM or Flash Memory 379. This memory stores the application and the upper layers of the Bluetooth protocol stack are loaded at boot-up, and executed by the on-chip application processor. The Bluetooth sequencer 364 is ROM-based. The General Purpose Input/Output ports (GPIO) 376 interface to push buttons, LEDs, and other peripherals part of the headphone. The high speed UART supports hardware flow control and data rates up to 460 kbit/s.

The embedded Bluetooth sequencer 364 executes the lower layers of the Bluetooth stack, while the host processor (CPU) 373 runs the application and the higher levels of the Bluetooth protocol stack software.

In one embodiment, RFID tag 371 may be a passive tag, which operates without the internal battery source of the headphone 152, deriving the power to operate from the radio field 351 generated by RFID tag-reader module 113 in media player 100 when in very close proximity (10-20 centimeters). In this case, the Bluetooth device serial number is transmitted by RFID tag 371 to RFID tag-reader module 113 in media player 100. If System-On-Chip 361 only has a passive tag there is no option to update the tag information, so the information may include only the Bluetooth serial number of the headphone unit 152, which may be hard-coded within RFID tag 371 during the manufacturing process.

In another embodiment, RFID tag module 369 can be a semi-passive or active tag powered by an internal battery allowing a greater RF communication range and higher data transmission rates. A semi-passive or active tag module 369 may include a read/write storage device 370. In the case of a semi-passive tag it is possible to process information before message transmission. This enables the transmission of additional information such as the Bluetooth Clock Offset, Bluetooth device serial number, and other parameters that would allow media player 100 to capture the media capability of the headphone 152 and facilitate the creation of a device profile on media player 100. Bluetooth communication settings, device information, and other data can be updated in the tag memory 370 by the application processor 373. The application processor 373 receives the Bluetooth communication settings from the Bluetooth sequencer 364.

In one embodiment, RFID activation button 118 on media player 100 may be pressed in order to activate the RFID reader functionality in RFID tag-reader module 113. Activation of the RFID reader functionality results in the RFID antenna 114 transmitting interrogation signals. When the headphone's RFID tag antenna 372 enters the radio field 351 generated by the media player's RFID antenna 114 and receives interrogation signals, the headphone's RFID tag transmits 352 the Bluetooth serial number and other parameters to the media player's RFID tag-reader module 113.

After the media player's RFID tag-reader module 113 receives the Bluetooth serial number and other parameters, the data is transferred to CPU 109. Media player 100 instantly sends a Bluetooth paging message using the received information via its short range transceiver 108. In response to the page, the headphone 152 performs a connection setup with media player 100 using normal Bluetooth session set-up procedure. Upon completion, media player 100 can stream all audio output via wireless signal 353 to the headphone unit 152.

The RFID discovery/paging process shortens the session setup time as compared to normal Bluetooth terminal discovery process for establishing a session. The RFID discovery methodology and system described herein can also be used in communication between two or more media player devices 100, if the devices are respectively equipped with RFID tags and RFID readers.

Figure 6:
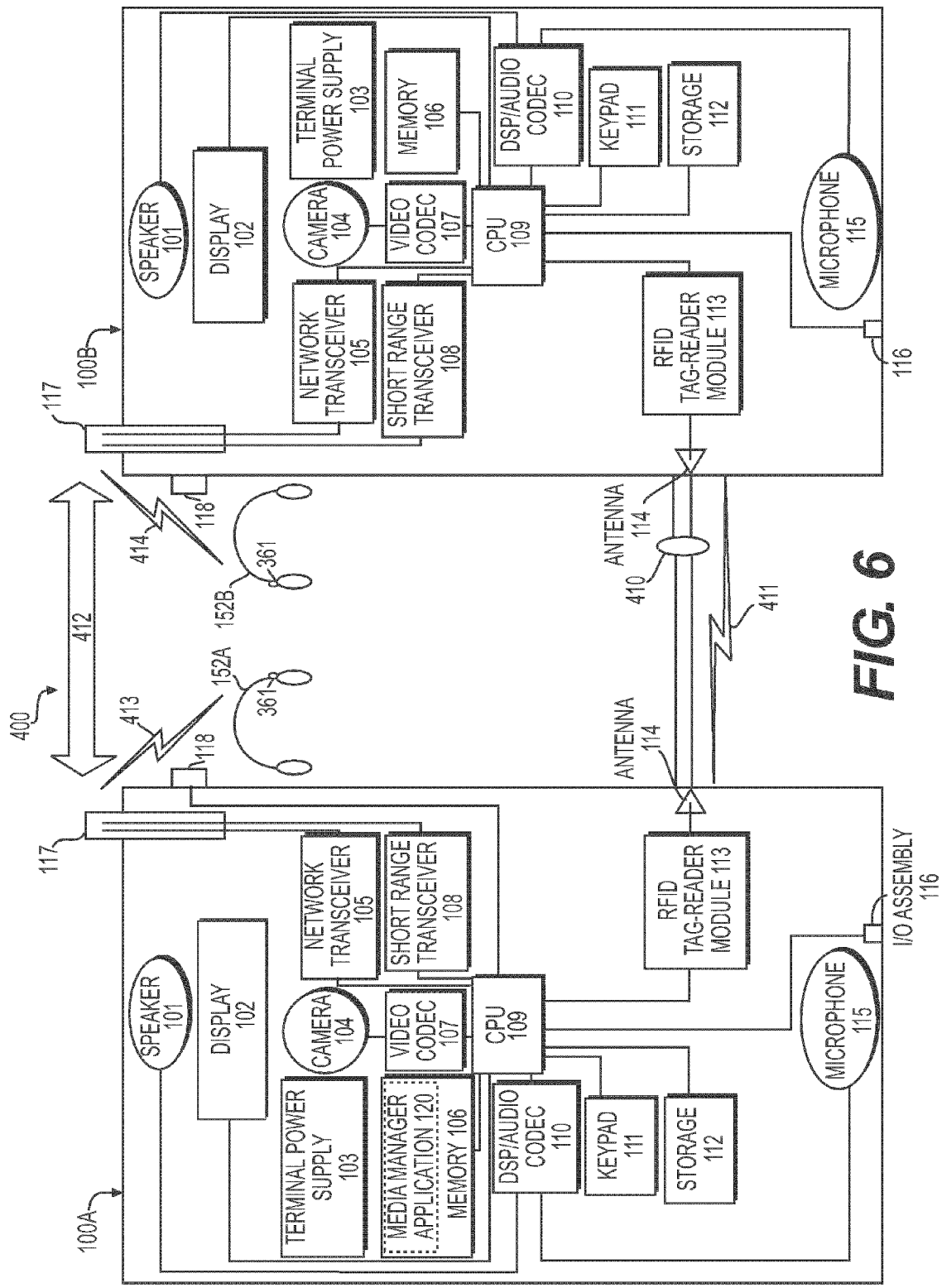
FIG. 6 is a functional diagram of two media player terminals wirelessly interfacing with one another and their respective headphone units, in accordance with one embodiment of the present invention.

Along those lines, FIG. 6 is a functional diagram of two media players 100A & 100B wirelessly communicating with one another and their respective headphones 152A & 152B, in accordance with one embodiment of the present invention.

In one embodiment, the first media player 100A is playing digital music stored in storage unit 112 using the media manager application 120 on media player 100A. The digital music is being transmitted wirelessly to a headphone unit 152A to which connectivity was established using the RFID discovery/paging process previously described. The user of media player 100A who is listening to the audio output via his wireless headset 152A decides to allow his friend to listen to the same music he is currently listening to. His friend also possesses a media player 100B and a wireless headphone 152B that have already established wireless connectivity via Bluetooth.

In accordance with the invention, RFID activation button 118 on the first media player 100A is pressed in order to activate the RFID reader functionality in RFID tag-reader module 113. Activation of the RFID reader functionality results in the RFID antenna 114 transmitting interrogation signals. At this time, the target media player's RFID tag-reader module 113 is in its normal state with tag functionally operable, and reader functionality disabled. When the target media player's 100B RFID tag antenna 114 enters the radio field 410 generated by the media player's 100A RFID antenna 114 and receives interrogation signals, the target media player's 100B RFID tag transmits the Bluetooth serial number, Bluetooth Clock Offset, media capabilities, and other parameters to the media player's 100A RFID tag-reader module 113.

After the media player's 100A RFID tag-reader module 113 receives the communication settings, media processing capabilities, and other parameters, the data is transferred to CPU 109. Media player 100A instantly sends a Bluetooth paging message using the received information via its short range transceiver 108. In response to the page, the target media player 100B performs a connection setup with the media player 100A using normal Bluetooth session set-up procedure. Upon completion, media player 100A automatically transmits the music content that is playing at the time the connection is established. The media content is transmitted via wireless signal 412 to the target media player 100B. Audio content that is transmitted from media player 100A to the target media player 100B, can be listened to on the headphone unit 152B which is wirelessly connected to media player 100B via wireless signal 414.

Figure 7:
FIG. 7 is a table depicting the message components and example content of a RFID message exchange between two electronic devices, in accordance with one embodiment of the present invention.

In accordance with another aspect of the invention, electronic devices with integrated RFID tags or tag-reader modules that use the RFID discovery process for automatically establishing a wireless connection will be capable of transmitting more than just communication settings via RFID. In accordance with one embodiment of the present invention, a sample RFID transmission 450 between two electronic devices may include, for example, the message components 451 outlined in FIG. 7. Also represented in the table is example content 452 for the different message components 451. The example content 452 listed in FIG. 7 is not meant to be exhaustive; examples are shown for exemplary purposes to help explain the invention.

The following is a discussion of the message components 451 contained in the RFID transmission data 450. The first message component is "device type" 453 which describes the unit's primary function (e.g., MP3 player, cellular phone, stereo, etc.). The "device type" 453 may be coded by the manufacturer, and typically corresponds to the same label used to market the device. In one embodiment, device manufacturers use standardized codes to represent the "device type" parameter in the RFID transmission data 450.

The second message component is "device manufacturer" 454 (e.g., XYZ Electronics). The name of the "device manufacturer" 454 could be represented in the user interface of another connecting device, as a way to provide validation that it is wirelessly connecting to the correct device. If the user saves the profile for the connecting device, the name of the "device manufacturer" can be helpful in differentiating between similar types of devices within a profile list.

The next message component is "device model" 455 (e.g., WaveRadio TH-190). The "device model" is the manufacturer's model number/code. In some cases, the "device model" may correspond to a model name that appears directly on the device. The "device model" 455 also helps in identifying a specific device.

The next message component, "device or user identifier" 456 may have been programmed in the device by the user to denote its location (e.g., "kitchen"), owner (e.g., "Anthony"), or other attributes (e.g., a complete calling card containing the contact information for the device owner such as f all name, title, company, mailing address, E.164 number, e-mail address, etc.). Unlike other message components that are established by the manufacturer or generated by the device itself, the "device/user identifier" 456 is input into the device by the operator. The "device/user identifier" 456 is also helpful in identifying specific devices from a list of device profiles. To properly represent its application, assume that a user has three stereos in his house that are wireless enabled, capable of processing digital music, and have RFID "hot spots" integrated. Further assume that all the stereos are manufactured by the same company, and are the same model.

In such instances, a differentiating piece of information like location or owner name could help identify the right device from a list of device profiles. Assuming that the stereos allow a user to input a device/user identifier, the user could in this example, input room locations as the identifier (e.g., kitchen, family room, basement). Alternatively, the user could use family member names if each stereo is in a different person's room (e.g., Anthony, Robert, John). Whatever information is input into each stereo as a "device/user identifier" 456, is what is used in its respective RFID transmission data 450. This information may also be particularly useful in a business setting wherein a number of users access various shared devices through user provided media players.

Separately, certain devices such as the wireless media player 100, may allow a user to specify an electronic calling card for the "device/user identifier" 456. As such, the user's calling card may be included in the RFID transmission data 450 and provided to the connecting device. This "calling card" may provide specific information about a user such as is included in a "vcard" as is known in the art. In the event that a particular device does not allow data input by the user, the manufacturer may provide a default setting for the "device/user identifier" 456.

The next message component is "profile settings" 457 and specifies, for example, whether to allow a profile for the device to be created on a connecting device. If profiles are allowed, the "profile settings" 457 further specify whether to allow the connecting device to be able to auto-detect and connect via wireless when in proximity. The profile settings 457 may be pre-set by the manufacturer, or may be adjusted according to user-driven preferences on the device.

The next message component is "RF capability" 458. This parameter specifies the supported wireless communications protocols (e.g., 802.11a/b/g/n, UWB, 802.15.4/ZigBee, Wireless USB, 802.15.3/WiMedia, Wireless 1394, Wireless FireWire, Bluetooth) and RF frequency bands for broadcast transmission/reception (e.g., UHF/VHF, AM/FM) available through the device. In the event that the device supports multiple communications protocols and frequency bands, they can be listed in the RFID transmission data 450 in order of preference. This information also enables connecting devices to try an alternate communications protocol, in the event that connectivity cannot be first established with a preferred one.

The next message component is "communication settings" 459. This includes the necessary parameters for configuring the supported wireless communications protocols. For example, if the Bluetooth protocol is supported, a Bluetooth terminal serial number and the Bluetooth Clock Offset of the device would be included. In the case of Bluetooth, "communication settings" 459 may further include details on supported Bluetooth profiles (e.g., handsfree, handset). The configuration settings overall will vary for each of the different communications protocols that are supported by the device. Additional "communication settings" 459 could be included for enabling security.

Security settings such as encryption keys may be included as part of the communication parameters 459. Various types of encryption keys can be populated by the media player 100 and other devices in their respective RFID transmission messages 450. For example, encryption data for three layers of the Open Systems Interconnection (OSI) model can be populated in the RFID transmission data 450: the application, the data link, or the network layers. Data encryption in these layers provides for secure communication over IP networks. Encryption keys for use in descrambling secure video and audio signals over broadcast frequencies like the ones mentioned can also be populated in the RFID transmission data 450 as discussed later.

Also included as part of the communication parameters 459 is a list of supported protocols and parameters for communication via the Internet (IP, SIP, etc.). A complete catalogue of protocols and parameters for operation of the Internet and its future development can be found on the Internet Assigned Numbers Authority (IANA) web site; any possible combination of protocols and parameters from the IANA site can be incorporated in the RFID transmission message 450 if supported by the device.

The next message component is hardware/software parameters 460. Hardware capabilities related to the device's display, audio equipment, data input hardware, and other components can be populated. Further, the device's operating system (OS) and other software capabilities can be provided in this category. Information such as OS version, list of supported software, and other software parameters may be included as a way to ensure compatibility and interoperability between devices. Certain connecting devices may use this information to only facilitate connections with devices that have identical hardware and software.

Finally, the device's media processing capabilities 461 are listed in the RFID transmission data 450. This information indicates the device's ability to process media assets that are in specific formats. For example, the media player 100 may support the following audio formats which would be listed in its RFID transmission data: MP3, WMA, WAV, AAC, HE-AAC, FLAC, Ogg Vorbis. Others are also possible. Video formats supported by the media player 100 might include, for example: MPEG 1, MPEG 2, MPEG 4, MPEG 7, AVI, and XviD. Image formats supported by the media player 100 might include, for example: JPEG, JPEG2000, TIFF, GIF, BMP, and PNG. Presentation formats supported by the media player 100 may include: PPS, and PPT. Internet content supported by the media player 100 might include: HTML, XHTML, DHTML, and JavaScript.

This type of information allows media player 100 to only transmit media assets which are supported by the target device(s). This information also allows either or both of the target device and media player 100 to convert media assets into supported formats before transmission to the other when required. The supported media formats for media player 100 listed above are not meant to comprise a complete and exhaustive list. It should also be noted that devices such as media player 100 may periodically update their media processing capabilities to be able to handle additional formats.

A standard message structure containing the RFID transmission information 450 in FIG. 7 allows a multitude of electronic devices to be able to quickly setup and establish wireless connectivity with each other using the RFID connector system previously discussed. In accordance with one embodiment of the present invention, a standard message structure for RFID transmission information 450 outlined in FIG. 7 allows different devices to rapidly discover each other's communication and media capabilities and other parameters. According to the invention, transmitting the media player's 100 RFID transmission information 450 and processing a target device's RFID transmission information 450 could facilitate the automatic activation of a radio transceiver with an appropriate communications protocol, allowing the media player 100 and target device to conserve power by not always having their wireless interface turned on.

The RFID transmission information 450 could also facilitate the automatic launching of specific software applications operating on either device. The RFID transmission information 450 could also facilitate the automatic customization of software properties on both devices (e.g., GUI menu options, layout, graphics, messages, etc.); for example, when selecting media assets to transmit to a target device, the media player 100 may only show files that the target device is capable of processing. The RFID transmission information 450 could also facilitate the automatic transmission of certain media assets upon connection (as discussed below). Receiving and processing another device's RFID transmission information 450 on the media player 100 could also facilitate the automatic presentation of media received from that device, without any user action being required on the media player 100. For example, if another device that has exchanged RFID transmission information 450 with the media player 100 wirelessly transmits a video to the media player 100, the media player can automatically launch the media manager application 120 and begin displaying the incoming video. Other automated operations by the media player 100 in response to receiving and processing a target device's RFID transmission information 450 are possible and within the scope and spirit of the invention.

A standard message structure could use special codes to represent message components 451 and content 452, that applications operating on various electronic devices, such as the media player 100, could universally interpret and process. The message components 451 listed in FIG. 7 are only general categories of the types of information that could be encoded in an RFID transmission message 450. Sub-categories and additional categories of information are possible while remaining within the scope and spirit of the invention.

RFID transmission information 450 received from other electronic devices can be used to establish and store device profiles on the media player 100. These device profiles can later be used by the media player 100 to automatically connect to these devices when in the vicinity, or to manually connect to them based on the user selecting a profile and initiating the connection. Data encoded in the RFID transmission 450 allows the media player 100 to appropriately organize the device profiles based on device type 453, making them easier to find.

According to the invention, the RFID transmission information 450 could be encoded by the media player 100 and other electronic devices using SOAP/XML. XML is the acronym for extensible Markup Language, the universal format for structured documents and data on the Web. XML is an industry-standard protocol administered by the World Wide Web Consortium (W3C). The use of standard XML tags amongst electronics manufacturers to represent data in the RFID transmission information 450 allows for greater interoperability between devices using the methods described herein. According to the invention, the XML-encoded device information for the media player 100 may be generated by an application operating on the media player and sent to the RFID Tag-Reader Module 113 where it is stored for later transmission.

According to the invention, an XML message parser may operate on the media player 100 to interpret received RFID transmission information 450 encoded using the XML schema. The XML parser may in turn make the processed data available to other applications operating on the media player 100. The use of other encoding schemes, other than XML, could be applied to standardizing the RFID transmission information 450, and would not be outside the scope or spirit of the invention.

In one embodiment, the RFID transmission information 450 format complies with the Universal Plug and Play (UPnP) specification as promulgated by the Universal Plug and Play Forum. The UPnP Device Architecture document details the protocols and conventions required of UPnP devices, and explains the basic patterns all UPnP devices follow in their operation. The UPnP specification includes similar information related to addressing, description, discovery, control, eventing, and presentation. UPnP is the foundation of other home networking standards such as the Digital Living Network Alliance and Intel's Networked Media Products Requirements (NMPR) specifications; the RFID transmission information 450 could also be formatted according to these other specifications. In yet another embodiment, the RFID transmission information 450 could be formatted according to Apple's Rendezvous specification. Rendezvous, is an open source protocol that enables the automatic discovery of computers, devices, and services on IP networks.

In one embodiment of the invention, the RFID transmission information 450 for the media player 100 is stored in the RFID tag memory unit 322 of the RFID Tag-Reader Module 113. Software and other changes which may be executed on the media player 100 may cause the RFID transmission information 450 to be dynamically updated in the RFID Tag-Reader Module 113. For example, if software operating on the media player 100 is updated to handle new audio and video formats, the software can automatically update the RFID transmission information 450 stored in the RFID tag memory unit 322 with the latest information on the device's media capabilities. This in turn allows a communicating device to ascertain the media player's most current As mentioned earlier, in one embodiment of the invention, the RFID transmission information 450 is transmitted from the target device which has an operable RFID tag to a master device which has enabled its RFID reader functionality. In accordance with the invention, it should be noted that RFID transmission information 450 as embodied in FIG. 7 can also be transmitted from a device which has an operable RFID reader to a device with an operable RFID tag. An RFID tag that can be written with data by the master RFID reader device can be realized with varying memory capacities. In this embodiment, both electronic devices transmit each other's device information, communication settings, and other data to facilitate cross-discovery and customization of software properties as described herein. Where there are two devices that will be sharing sensitive media between each other and enhanced security is desired, this embodiment is preferred as both devices can discover each other's capabilities rapidly upon exchanging RFID transmission information 450. In this embodiment, enhanced security is provided as both devices can share each other's encryption keys via the RFID exchange methods described.

There are instances where media only flows in one direction, as is the case with the media player 100 transmitting audio signals to a wireless headphone 152. In such an instance, the media player 100 only needs to discover the capabilities of the headphone 152, and not vice versa. As such, devices like the headphone unit 152 which may only receive data, only require a passive or active RFID tag.

Figure 8A:
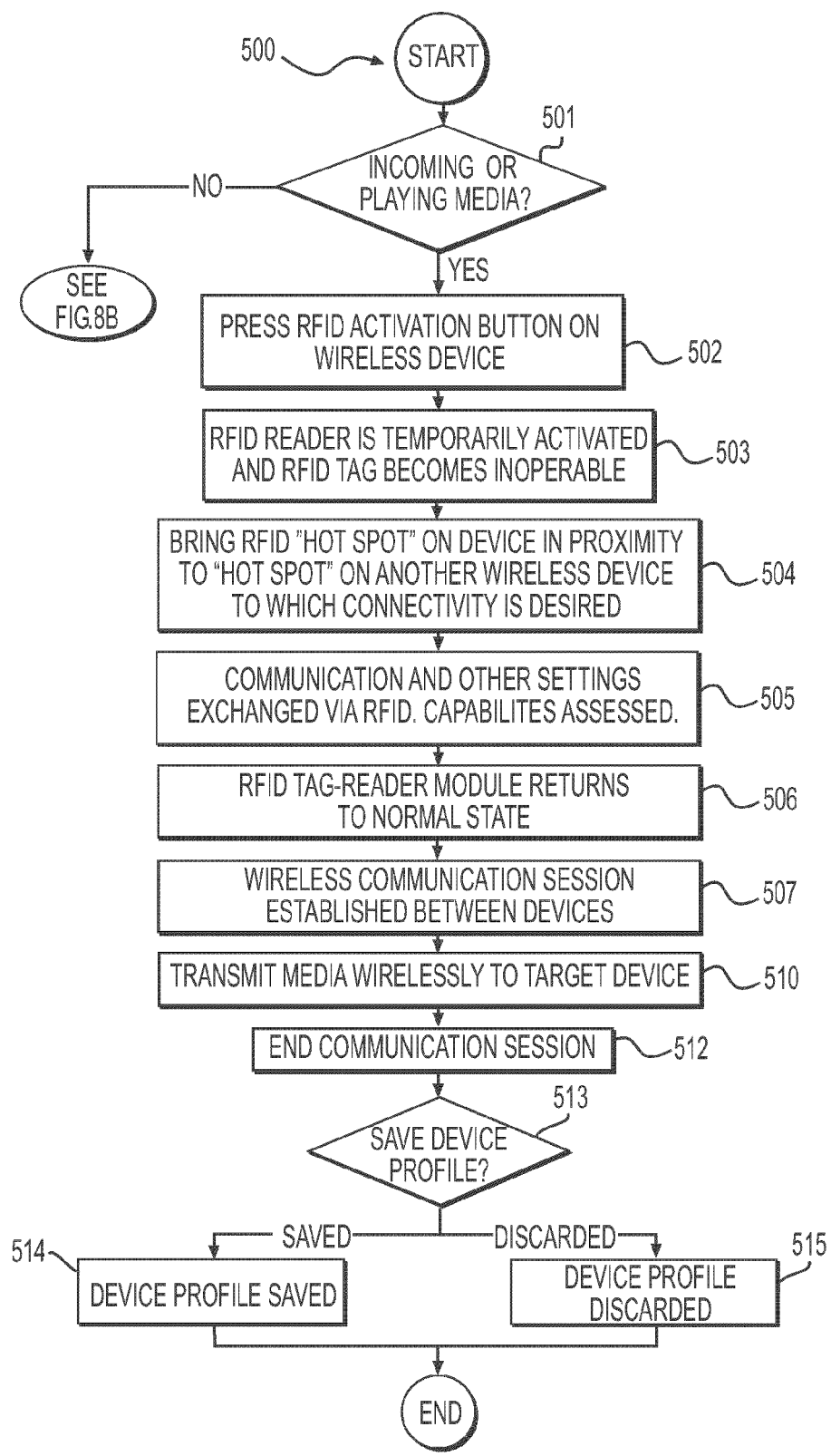
FIG. 8A is a flow diagram of a wireless transmission method using RFID setup, in accordance with one embodiment of the present invention.

In accordance with the invention, data stored in a device profile can periodically be updated over-the-air when the media player 100 establishes a communication session with the target device. According to the invention, the media player 100 may periodically poll the target device for new profile information. A new profile is sent over-the-air to the media player 100, and the old device profile record is updated. This is an especially important feature for devices that may be continually updating their media processing capabilities. Device profile information stored on the player 100 could be encoded using an XML schema. As such, over-the-air updates of device profiles could be encoded the same way. As previously mentioned, other encoding schemes are also possible FIG. 8A is a flow diagram of a wireless transmission method using RFID setup, in accordance with one embodiment of the present invention. The flow diagram is outlined from the perspective of a media player 100 establishing connectivity with a target electronic device. The method generally begins at decision point 501, where it is determined if media is being received from an external source and viewed on the player 100, whether media stored on the device is being played/viewed at that instance, or whether a resident game is operating on the player 100.

In the first case mentioned, the user of media player 100 may decide that he wants to wirelessly transmit the incoming media to another electronic device to facilitate enhanced viewing, for example, on a large television with surround sound. Alternatively, he may decide to share the incoming media with a friend in the vicinity that also has a wireless media player device. Similarly, in the second case, the owner of the media player 100 may be listening to digital music stored on the device and may decide to wirelessly transmit the media to a stereo system that provides for enhanced listening with its powerful speakers and sound output capability. Finally, in the last case, the owner of the media player 100 may be in the midst of playing a game operating on the device and may wish to allow one or more of his friends with a similar device to wirelessly connect to his media player 100 and compete in multi-player mode.

All of these examples assume that the target devices are wireless enabled, have compatible media processing capabilities, and have integrated RFID modules.

A user that is engaged in viewing incoming media or listening to music stored locally on the media player 100 should be able to automatically establish a wireless connection with a target device and transmit the same media for listening/viewing pleasure on the target device with minimal effort. Similarly, a user should also be able to establish wireless connectivity with minimal effort with other devices in order to play multi-player games. The RFID discovery method previously described allows two electronic devices that have integrated RFID components and a common wireless interface to do just that.

For the purpose of reviewing the method outlined in FIG. 8A, assume that the media player 100 is playing digital music stored on the device. The operator of the media player 100 wants to transmit the media content that is playing on the device to a stereo that has an RFID "hot spot" and an integrated RFID tag-reader module 113 for wireless setup. The stereo is Bluetooth-enabled and allows connectivity to compatible Bluetooth devices such as the media player 100 for exchanging media content. For illustrative purposes, both the media player 100 and stereo are Bluetooth-enabled. For purposes of this invention, the devices could communicate via any other known wireless protocol.

Following block 502 in FIG. 8A, the operator of media player 100 presses the RFID activation button 118 on the media player 100. As previously outlined, this activates the RFID reader functionality and makes the RFID tag functionality inoperable in the RFID Tag-Reader Module 113 (block 503). The media player's RFID antenna 114 begins transmitting interrogation signals. Per block 504, the operator brings the media player's "hot spot" 221 in range of the stereo's RFID "hot spot". In block 505, the stereo's RFID tag transmits its RFID transmission information 450 to the media player's RFID antenna 114 in response to a received interrogation signal. In an alternate embodiment, the media player 100 first transmits its RFID transmission information 450 to the stereo's RFID tag as part of the interrogation signal, and receives back the stereo's RFID transmission information 450. In both embodiments, the receiving device uses the received RFID transmission information 450 to process the opposite device's communication, media processing, and other capabilities.

In block 506, RFID Tag-Reader Module 113 in the media player 100 returns to its normal state, with the tag functionality switched and the reader functionality inoperable. In block 507, wireless connectivity between media player 100 and the stereo is established. At block 510, media player 100 begins wirelessly transmitting the media that is currently playing on media player 100, from its current position, to the stereo along with information about the media (e.g. song name, artist, album, etc). The stereo can display the received media information on its LCD if one is available. Media player 100 transmits the media to the stereo in a supported format as ascertained during step 505. In accordance with the invention, if the format of the media that was playing on media player 100 is not supported by the stereo, as ascertained in step 505, the media player 100 can automatically convert the media into a format that is supported by the stereo. The conversion process of media from one format to another, and the transmission of the converted media can occur dynamically as the media continues to play on media player 100.

While connected, media player 100 can transmit the user's playlists or song selections exactly as they play on the media player 100 to the stereo. This allows the user to listen to them via the stereo just as he would have directly from the media player 100. In accordance with the invention, while connected—the user can use the controls of the media player 100 to control the media playing experience on the target device. For example, the "stop", "pause", "play", "rewind", "fast forward", and other buttons on the media player 100 can be used to control the audio attributes on the stereo in the current example. For other target devices, various other controls may be operated via media player 100.

Per block 512, the user may terminate the wireless session between the stereo and the media player 100 by using the software/hardware controls available on either device to perform the operation. Upon termination of the wireless session, per block 513, the user will be prompted on the media player 100 to state whether he wants to save the device profile for the stereo. The user would only see this prompt if the stereo specified a permission in its profile settings 457 allowing the user to create a profile for the device. Per block 514, the user can decide affirmatively to save the profile of the stereo to which he was previously connected. If the user doesn't want to save the device profile, it is discarded as shown in block 515 per the user's action. Device profiles allow users to connect to the same device in the future either automatically (when in range of the device's RF signal), or manually by selecting the profile from a list (and when within range of the device's RF signal).

Figure 8B:
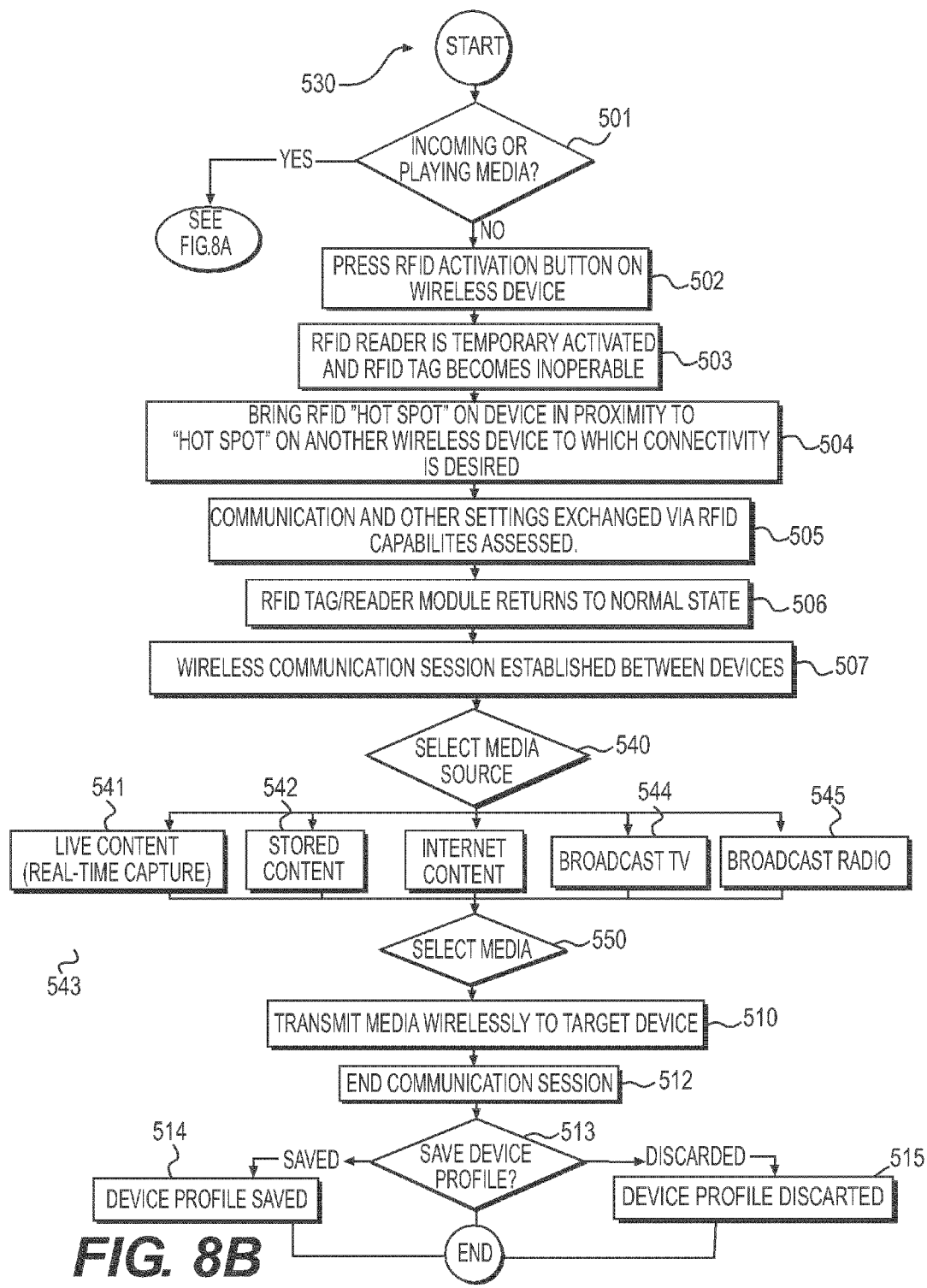
FIG. 8B is a flow diagram of an alternative wireless transmission method using RFID setup, according to the invention.

FIG. 8B is a flow diagram of a wireless transmission method using RFID setup, in accordance with another embodiment of the present invention. Like FIG. 8A, the method outlined in FIG. 8B also begins at decision point 501, where it is determined if media is being received from an external source (target device), whether media stored on the device is being played/viewed, or whether a resident game or other application is operating on the device therein. In contrast to FIG. 8A, this example assumes there is no incoming media, no locally stored media being played/viewed, and no game or other application operating therein.

In the method outlined in FIG. 8B, the user desires the ability to wirelessly connect the media player 100 with a target device in its vicinity, in order to transmit certain media assets to the target device. The process of connecting the media player 100 to the target device in steps 502-507 were discussed earlier, and are the same in this example. Upon establishing wireless connectivity with the target device, the media player 100 prompts the user to select the content source from which he wants to select a media asset to transmit to the target device. For example, the user may be presented with three options from which to select from in step 540. The first option is "live content" (real-time capture) 541. The options within the "live content" option 541 are dependent on the capabilities of the respective media player 100. For example, some media players 100 may come equipped with a built-in camera for capturing digital pictures. Other media players 100 may have functionality to capture video and audio.

As such, selecting the "live content" 541 option will further prompt the user to select the specific type of "live content" he wants to capture and transmit to a target device. Selecting "images", for example, would allow the user to take pictures and have them instantaneously stored locally while also being transmitted to a target device in its vicinity for viewing. Similarly, selecting "video" would activate the video camera functionality in the media player 100 and allow the user to capture a live video feed that is stored locally and transmitted to the target device. Similarly, selecting "audio" would activate the audio capture functionality in the media player 100 allowing the user to record and transmit audio to a target device.

Another content source is "stored content" 542. This content source encompasses all media resident in the media player's storage unit 112. "Stored content" 542 may include video, music/audio, pictures, presentations, animation, Internet-content, and other media types. As above, these media files may be transmitted to one or more target devices as discussed herein.

The next content source is "Internet content" 543. This content source encompasses a number of Internet media sources for movies, music, radio, news and other content. Selecting any one of these Internet categories/channels may provide additional sub-categories which help users find the genre or type of content that they may be searching for. A media guide may be available to help users find the content they are looking for on the Internet. The "Internet content" option could, for example, allow a user to browse movie trailers on his wireless media player 100, select a movie for download, pay for the movie, and use the media player 100 to re-transmit the selected movie to a television in the vicinity using the methods described herein. The user can in turn use the media player's controls to adjust the viewing experience on the television. For example, while watching the movie on his television, the user can pause, rewind, or fast-forward the movie using controls in the media player 100.

The next content source is "broadcast TV" 544. This content source encompasses content received via broadcast frequency bands such as UHF and VHF and other over-the-air sources. A transceiver and tuner in the media player 100 allows the unit to receive local television channels and other content from local devices in the vicinity via these frequency bands. Content from these sources can be further transmitted by the media player 100 to other devices in accordance with the invention. One possible example includes receipt by media player 100 of a satellite based content stream such as "XM" or "Sirius" satellite radio or other providers. The media manager application operating on media player 100 allows the user to browse different channels.

The next content source is "broadcast radio" 545. This content source encompasses content received via broadcast frequency bands such as AM and FM. A transceiver and tuner in the media player 100 allows the unit to receive radio channels and content from local devices in the vicinity via these frequency bands. Content from these sources can be further transmitted by the media player 100 to other devices in accordance with the invention. The media manager application operating on media player 100 allows the user to scan and seek different radio channels.

In one embodiment of the invention, only content sources capable of being processed by a selected target device are displayed to the user by the media player 100 in the graphical user interface. Thus, when the user selects the desired target device, media player 100 can use the profile associated with that target device to determine allowable media types. Further, within a particular content source category, only media assets that can be processed by the target device are displayed on the media player 100 to the user.

Upon selecting content from any of the content source options, media player 100 begins wirelessly transmitting the media asset that was selected to the target device along with information about the media asset if available (e.g., file name, song name, artist, album, source, copyright, etc). The target device can display the media information on its display screen if one is available. The media player 100 transmits the media asset to the target device in a supported format as ascertained in step 505. As previously mentioned, the media player 100 can convert the media asset into a format that is supported by the target device if necessary and if the applicable conversion utilities are present. Steps 512-515 that deal with terminating a wireless connection and establishing a profile for the target device on the media player 100 are the same as described earlier during discussion of methods illustrated in FIG. 8A.

Figure 9:
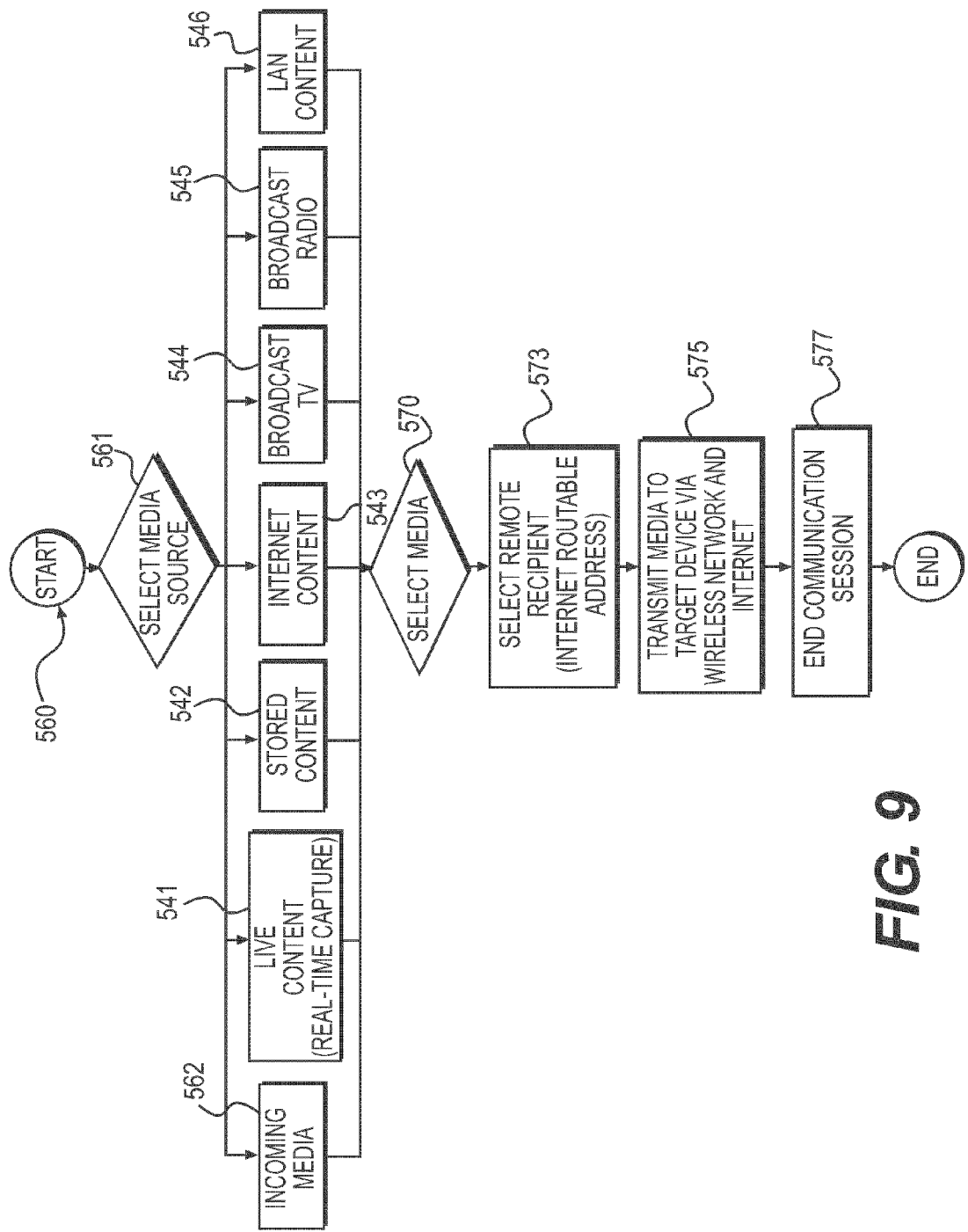
FIG. 9 is a flow diagram of a wireless transmission method via a wireless network and the Internet, in accordance with one embodiment of the present invention.

FIG. 9 is a flow diagram of a wireless transmission method 560 via the Internet, in accordance with one embodiment of the present invention. The examples illustrated in FIG. 8A and FIG. 8B described how two devices that are in within local RF proximity to one another can exchange communication, media processing capabilities, and other parameters via RFID, establish a wireless connection, and exchange media content between one another, either automatically (as outlined in FIG. 8A) or manually (as outlined in FIG. 8B).

The example illustrated in FIG. 9 may be implemented by a media player 100 that has an integrated network receiver 105 that can connect to a cellular network, such as a Global System Mobile (GSM) network, and further gain access to the Internet. The example 560 depicts how media assets can be selected and targeted for transmission to another Internet-connected media processing device via a wide area network, comprising, for example, a cellular network and the Internet. Alternatively, the media player 100 can use its short range transceiver 108 to connect to a local wireless access point to gain access to the Internet for the same purposes.

Example 560 requires the use of the media manager application on the media player 100. The example 560 begins at decision point 561 where the user is prompted on the media player 100 to select a media source from which specific content will be selected for transmission to another Internet-connected device. The user is presented with options which include, "incoming media" 562, "live-content" (real-time capture) 541, "stored content" 542, "Internet content" 543, "broadcast TV" 544, and "broadcast radio" 545.

"Incoming media" 562 refers to media which is being received by the media player 100 in real-time from an external source (e.g., from an electronic device in close proximity via short range RF, another device via the Internet, etc). "Incoming media" 562 may include, as example, audio, video, and image communication. "Live content" 541 refers to data captured in real-time using the media player's internal media capture capability (e.g., integrated camera, audio recording apparatus, etc). Upon selecting a specific "live content" option, the appropriate internal media capture functionality in the media player 100 is activated. This allows media to be captured, stored on the device, and simultaneously transmitted to one or more target devices. Having the "live content" media stored on the media player 100 may be a user-defined option in the media manager application.

"Stored content" 542 includes media assets that reside in the media player's hard drive 112. "Internet content" 543 includes media content (e.g., video/movies, audio/music, images, etc.) that can be selected for download from an Internet connected server or storage device to the media player 100 and re-transmitted to a target device. "Broadcast TV" 544 encompasses content received via broadcast frequency bands such as UHF and VHF. Similarly, "Broadcast Radio" 545 encompasses content received via broadcast frequency bands such as AM and FM. "Local Area Network (LAN) Content" 546 includes media content stored in recognized devices that are within short-range RF proximity of the media player 100; the media player 100 may "auto-detect" devices in its proximity as described herein, and have access to all/some media content stored in these devices. The media player 100 is able to access the storage apparatus of a target device, obtain a complete list of files available for access, and also obtain information about each respective file such as media type (e.g., video, audio, image, etc.), media title, artist/producer, date, etc. In accordance with the invention, the media player 100 can in turn organize the target device's media library into categories (similar to those found in FIG. 18) that can be visually presented to the user to help locate specific files on the target device. In accordance with the invention, the media player 100 also allows an operator to specify if he wants to provide open access to some/all media assets stored in the media player 100 for specific connecting devices or any connecting device. The operator can also specify the access method of specific media assets stored in the media player 100; for example, media assets can be enabled for download, "view only access", or "listen only access." "View only" and "listen only" access prevent connecting devices from copying the media asset, but allows them to still view or listen to the media asset.

Upon selecting specific media assets from the media source categories in step 570 the user is prompted (in step 573) to select the addresses of one or more remote recipients to which the media assets should be transmitted. The user may be presented on screen with a contact list or "buddy list" from which to select one or more recipients of the media assets. In a preferred embodiment, the contact list or "buddy list" profiles contain unique addresses for target devices which can be resolved via the Internet, for routing over the global network. Possible Internet address schemes include E.164 phone numbers and Uniform Resource Identifiers (URIs). As previously mentioned, the media player 100 itself may have one or more of these address types mapped to it for resolution via the Internet.

E.164 is the name of the international telephone numbering plan administered by the International Telecommunications Union (ITU), which specifies the format, structure, and administrative hierarchy of telephone numbers. "E.164" refers to the ITU document that describes the structure of telephone numbers. A fully qualified E.164 number is designated by a country code, an area or city code, and a phone number. For example, a fully qualified, E.164 number for the phone number 555-1234 in Washington, D.C. (area code 202) in the United States (country code 1) would be +1-202-555-1234.

In one embodiment, media player 100 transmits a fully qualified E.164 number and connection request to a media gateway within its respective mobile operator's core network. The media gateway uses the Electronic Numbering (ENUM) protocol to resolve the fully qualified E.164 telephone number for the target media processing device to a fully qualified domain name address corresponding to the target device using a DNS-based architecture. ENUM (E.164 Number Mapping, RFC 3761) is a system that uses DNS (Domain Name Service, RFC 1034) in order to translate certain telephone numbers, like '+12025551234', into URIs (Uniform Resource Identifiers, RFC 2396) like 'sip:user@sipcarrier.com'. These URIs are contained within NAPTR (Naming Authority Pointer) Resource Records sent to the media gateway in response to the DNS query. ENUM exists primarily to facilitate the interconnection of systems that rely on telephone numbers with those that use URIs to route transactions.

The service record may specify that the target user prefers to receive calls addressed to a specific user (bob) at a server address (sip.sampleserver.com). The service field specifies, for example, that the Session Initiation Protocol (SIP) is to be used, in conjunction with the E.164 to URI (E2U) resolution service.

The media gateway then picks the sip+E2U service and performs the associated regular expression transform using the original E.164 number and the regular expression. This produces the sip: URI. The media gateway then uses the DNS a second time to translate the domain part of the URI (e.g, sip.sampleserver.com), into an IP address using a DNS A record.

The media gateway then opens up a session with UDP port 5060 on the target SIP server to complete the call setup, requesting a media session with the user (bob) on this server. If the E.164 number was associated with a wireless device, the request may in turn be forwarded to the target device via a radio access network. Upon connecting with the target device, a secure, peer-to-peer communication session is established between the media player 100 and the target device.

In a preferred embodiment, media player 100 has a Session Initiation Protocol (SIP) framework operating on the device to facilitate communication using the protocol. The use of SIP for transmitting media to one or more target media players connected to the Internet is preferred as mobile operators are moving towards a SIP-based architecture for multimedia services. It is envisioned that the use of SIP for communication between two media player devices could leverage the same SIP registrar, proxy, presence servers, and other related infrastructure used to deliver real-time converged services within a mobile operator's network. The media player's SIP application framework allows media player 100, in conjunction with SIP infrastructure at the mobile operator, to simultaneously transmit content from media player 100 to multiple devices over the Internet.

Capabilities discovery is an important feature of SIP systems. Similar to the capabilities exchange via RFID described above, SIP offers the ability for devices to exchange media processing and other capabilities information using the protocol.

While the use of SIP for such purposes is preferred, alternative application protocols may be used in lieu of SIP while still remaining within the scope of the present invention.

In step 575, after peer-to-peer connectivity is established between media player 100 and the target device, the selected media assets are transmitted to the target device from the media player 100. Media player 100 may simultaneously transmit media content to multiple target devices. In accordance with the invention, the user operating media player 100 may use the media player's control functionality, including buttons (e.g., pause, rewind, fast forward, etc.) for managing the user experience of the media asset on the target device. In accordance with the invention, the operator of the target device(s) may be permitted to use similar controls contained in the target device in order to manipulate media transmission from the media player 100. In accordance with the invention, information about the control functionality permitted for use on the target device is transmitted by the media player 100 to the target device before the actual transmission of the media asset. This information could specify among other things, what controls to enable on the target device and what specific buttons could be used to activate certain control functions. In another embodiment, the media player 100 may transmit a GUI-based control panel for display on the target device, which can in turn be used by the operator of the target device to control the viewing/listening experience of the media asset being received from the media player 100.

Upon successfully transmitting media assets to the target device, the operator of the media player 100 or the target device may terminate the peer-to-peer connection (step 577).

Similar to the methods described above, the media player 100 is capable of receiving media assets from other Internet connected devices.

Figure 10:
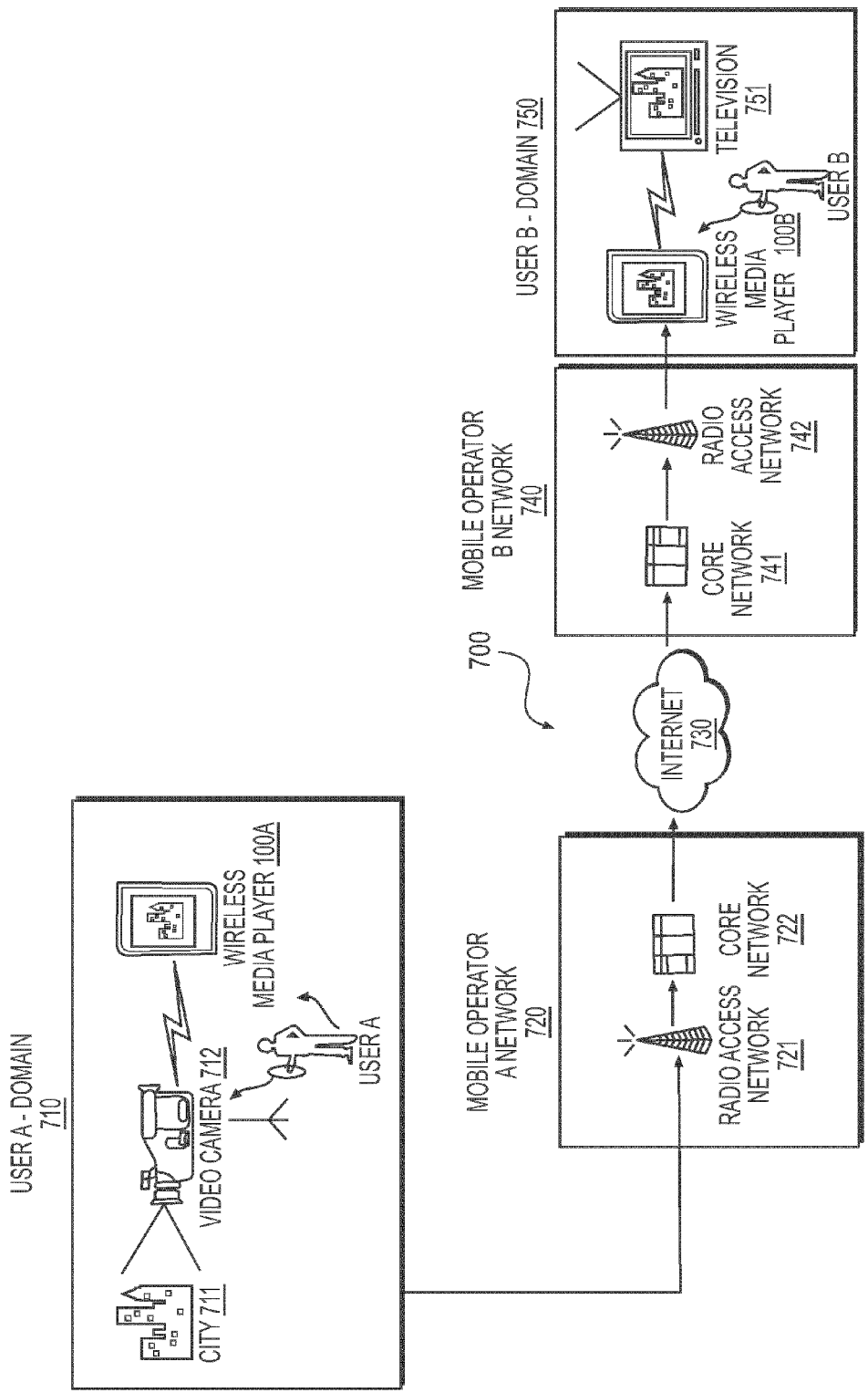
FIG. 10 is a functional diagram of a media player terminal capturing a video feed from an external video recording device, and transmitting the same video content via a cellular network and the Internet to another media player terminal, which further transmits the content to a television, in accordance with one embodiment of the present invention.

FIG. 10 is a functional diagram of a media player 100A wirelessly capturing a video feed from an external video recording device 712, and transmitting the same video content via a cellular network 720 and the Internet 730 to another media player 100B, which further transmits the content to a television 751, in accordance with one embodiment of the present invention.

In FIG. 10, connectivity between the video camera 712 and the wireless media player 100A is initially established using the RFID setup process as previously discussed. The video camera in FIG. 10 has an integrated RFID tag-reader module and a wireless interface for communication with other devices.

The video camera 712 is recording a city landscape 711 and simultaneously transmitting the video feed to the wireless media player 100A in User A's domain 710. Using the media manager application operating on the media player 100A, User A specifies that he would like the video feed to be transmitted to User B's wireless device 100B. User A selects User B's name from a contact list or "buddy list" stored on the media player 100A. Mapped to User B's name could be an E.164 number, URI, SIP address, or other Internet-routable address which corresponds to User B's wireless media player 100B. All of these address types can be resolved via the Internet to target the delivery of the live video feed to User B's media player 100B.

User A's media player 100A is connected to Mobile Operator A's network 720 via RF signal to the radio access network 721. Resolution of the address schemes mentioned above and connectivity with the target device may employ the use of Mobile Operator A's core network 722 which may include among other components, DNS servers and SIP registrar, proxy, and presence servers, and other related communications infrastructure connected to the Internet 730. Mobile Operator A's DNS systems may be configured to resolve the E.164 number, URI, or SIP address to an Internet Protocol (IP) address for communication via the Internet 730 or a private network. The IP address is further used to establish a SIP peer-to-peer session over the Internet between media player 100A and 100B as earlier described.

In this case, User B's media player 100B resolves to Mobile Operator B's network 740. A SIP invite is sent over the Internet from mobile operator A's core network 722 to mobile operator B's core network 741. The request is further transmitted through operator B's radio access network 742 to the wireless media player 100B. Wireless media player 100B is notified of the connection attempt (and possibly details of the media set for transmission) from media player 100A. Assuming the connection attempt is accepted by user B, a SIP peer-to-peer connection is established between the two devices. Media player 100A begins transmitting the video content to media player 100B. Both devices use buffering and flow control technology to regulate the transmission and reception of media.

As User B watches the video feed from User A's media player 100A on his media player 100B, he may decide that he wants to watch the video feed on his television for an enhanced viewing experience and surround sound. The scenario 700 represented in FIG. 10 assumes that the television 751 in User B's domain 750 has an integrated RFID module and a RF interface for communication with other devices.

User B, can simply press the RFID activation button 118 on the media player 100B and bring the media player "hot spot" in proximity to the RFID "hot spot" on the television. Wireless connectivity between the devices using any number of supported wireless protocols is automatically established, and the media content is automatically transmitted per the steps described in FIG. 8A.

In one embodiment, the television 751 is not able to process packetized streaming video content, but is able to handle a video broadcast signal using its antenna receiver. As such, User B's media terminal 100B automatically recognizes the television's media processing capabilities using the information captured during the RFID information exchange. In accordance with the invention, the media manager application operating on media player 100B is able to dynamically convert the incoming packetized streaming content to a broadcast signal (e.g., UHF, VHF) that the television can process using its own receiver and in turn display.

In accordance with the invention, the media player 100B in FIG. 10 has an integrated short-range broadcast antenna and transceiver that supports UHF, VHF, FM, and AM broadcast and reception. The media player 100 also supports the High Definition Television (HDTV), National Television Standards Committee (NTSC), Systeme Electronique pour Couleur avec Memoire (SECAM), and Phase Alternating Line (PAL) standards used in different parts of the world. In accordance with the invention, the media player 100 may also have the ability to dynamically convert broadcast signals (e.g., UHF, VHF, FM, or AM) that it receives into a digital format that can be streamed or otherwise transferred to one or more devices over a packet network, such as an Internet Protocol (IP) network using the steps described above. In accordance with the invention, the media manager application 120 operating on the media player 100 also has the ability to receive a broadcast signal (e.g., UHF, VHF, FM, or AM) and convert the content to a digital format that can be recorded and stored in the media player's hard drive 112.

Returning to FIG. 10, the television 751 in one embodiment automatically displays the broadcast content from the media player 100B, as the RFID exchange may have triggered the television to automatically change channels to one used specifically for receiving broadcast signals from devices in the proximity.

To prevent the broadcast from being picked up by other devices in the vicinity, the media player 100B, can scramble the content before broadcasting it. In one embodiment, the media player 100B transmits a decryption key for descrambling the broadcast signal in the RFID transmission message 450 during the initial RFID exchange between the devices. The cryptographic techniques and methods for securing video and audio signals is widely known and documented. Commonly used algorithms supported by the media player 100 and used for encrypting digital content include Digital Video Broadcasting—Common Scrambling Algorithm (DVB-CSA), Advanced Encryption Standard (AES), and Triple DES (Data Encryption Standard). The television 751 may have the capability to store a "device profile" for the media player 100B to facilitate future communication sessions; the "device profile" may contain the decryption key that was initially received from the media player 100B during the RFID exchange.

Figure 11:
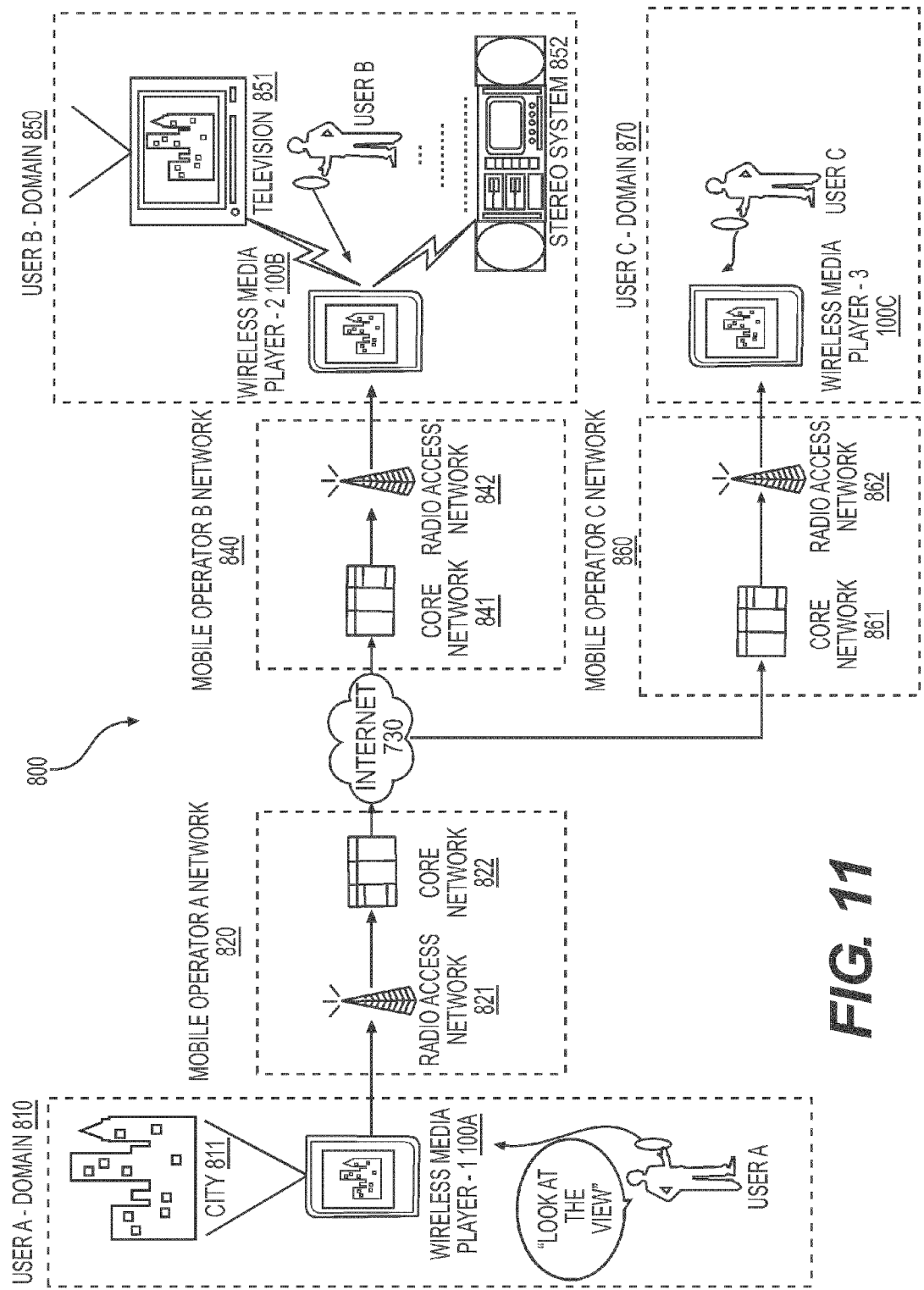
FIG. 11 is a functional diagram of a media player terminal with an embedded video recorder, filming a city scene, and transmitting the video content via a cellular network and the Internet to two separate media player terminals connected to different mobile operator networks, in accordance with one embodiment of the present invention.

FIG. 11 is a functional diagram of a media player with an integrated video camera 100A, filming a city scene 811, and transmitting video/audio content via a cellular network 820 and the Internet 730 to two separate media player devices 100B & 100C connected to different mobile operator networks 840 & 860, in accordance with one embodiment of the present invention.

In contrast to FIG. 10, user A as represented in FIG. 11 selects two recipients to which he wants the content streamed. This illustration demonstrates that the media player 100A is capable of streaming media content over a wide area network, comprising for example a cellular network and the Internet, to multiple devices that are also Internet-enabled. Content distribution to multiple devices via the Internet may be accomplished using the Session Initiation Protocol (SIP) and related infrastructure within mobile operator A's core network 822.

In FIG. 11, user B is shown to have established wireless connectivity with two devices via an RFID exchange per the steps illustrated in FIG. 8A above. The user B domain 850 is shown as such in order to exemplify that an incoming video feed can be separated so as to present the image portion of the feed on a television 851, and the audio portion via a stereo 852 with surround sound. The ability to separate the audio and image components of incoming or stored video is provided by the media player 100B. The process of separation is completely automated if connectivity is established with more than one target electronic device using the RFID connector system and methods illustrated in FIG. 8A above.

User C in FIG. 11 is shown simply to be watching the incoming video feed on his wireless media player's 100C integrated display screen 102.

As described up until now, the media player 100 has the ability to receive media content from a wide array of devices either in local proximity or over a wide area network. The media player 100 also has a built-in transceiver for transmitting/receiving content via broadcast frequency bands such as UHF, VHF, AM, and FM. In accordance with the invention, the media player 100 may have the ability to receive, for example, television and radio content over these broadcast frequency bands and convert the content to a digital format that can be stored in the media player's hard drive 112 and later accessed by the user via the media manager application operating on media player 100. According to one embodiment of the invention, the media manager application enables the media player 100 to function as a digital video recorder (DVR). The digital video recording functionality can be enabled at the user's option. When enabled, the media player 100 digitally encodes all incoming broadcast signals being viewed by the user, and a saves them to the media player's hard drive, allowing the user to pause, play, rewind, watch video in slow motion, and perform other operations with live programming similar to digital video recording devices such as TiVo or ReplayTV.

The media manager application 120 operating on the media player 100 also allows the user to record specific television and radio segments at specific times. The digital video recording functionality part of the media manager is also designed to work with Internet TV implementations. The digital video recording functionality allows the media player 100 to record multiple pieces of incoming media simultaneously. The digital video recording functionality automatically records incoming media transmissions of video, audio, images, presentations, animation, Internet content, and other media types received from other external devices. The automatic recording of incoming content from other devices allows a user to immediately begin viewing or listening to the received content without being prompted up front on whether he would like to store the content on the media player's hard drive. This alleviates the possibility of missing, for example, part of a live event being transmitted to the media player 100.

The user may decide after the transmission is complete or at some point in the future on whether to retain the content that is presently stored in the media player's hard drive 112. If the user decides to retain the content, he will need to mark it as a file he wants moved to the permanent storage area of the media player's hard drive 112 before an expiration date. Otherwise, content that is stored on the hard drive via the digital video recording functionality will automatically be purged from the hard drive's temporary storage area after a set time interval (e.g., 1 month). DVR content that remains in the temporary storage area of the hard drive 112 is automatically purged on a "first in, first out" basis based on a set expiration interval or some other basis as desired by a user or pre-configured in media player 100.

The media manager application operating on the media player 100, supports standards based and proprietary Digital Rights Management (DRM) technologies. As such, the media manager may control certain copyrighted media assets and restrict its usage in certain ways. For example, the media manager, may prevent certain content that is received on the media player 100 from being stored on the device (even temporarily with the use of the DVR functionality). Similarly, the media manager may prevent certain content that was received, but permitted to be stored, from being re-transmitted to other users. Other types of restrictions on the usage of media assets could be enforced by the media manager application operating on media player 100. Further, the media manager may permit the operator of the media player 100 to impose his own DRM restrictions and rules on content he generates and transmits to other devices via the media player.

FIGS. 12-20 are illustrations of exemplary user interface screens depicting various aspects of media player 100 functionality.

Figure 12:
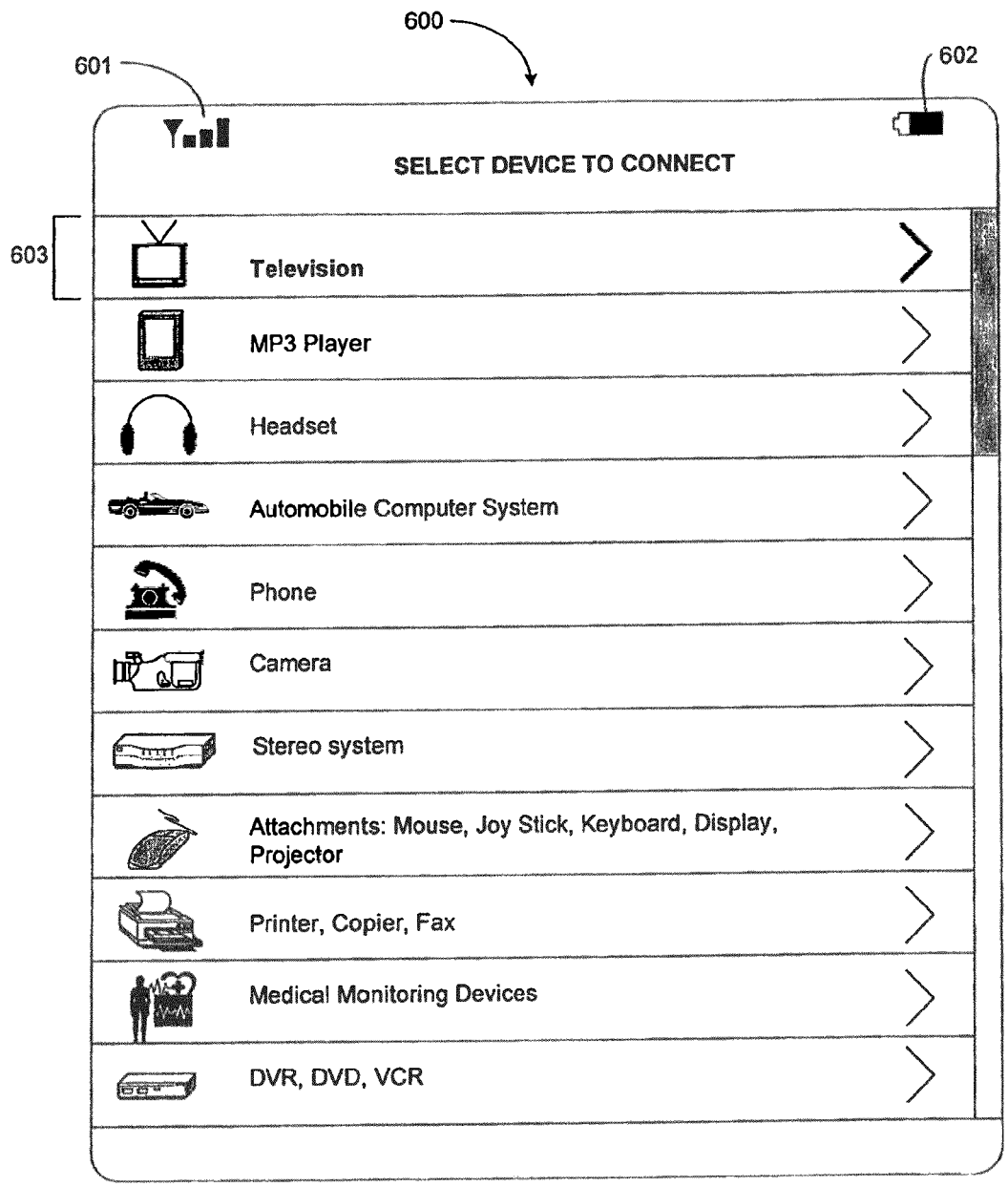
FIG. 12 is an illustration of an exemplary user interface screen depicting device categories, in accordance with one embodiment of the present invention.

FIG. 12 is an illustration of an exemplary user interface screen 600 depicting "device profile" categories, in accordance with one embodiment of the present invention. The screen 600 depicts several device categories in which profiles of wireless devices which previously exchanged communication settings, media processing capabilities, and other parameters via RFID exist.

Device profiles may exist for devices that can generally be classified as either media processing units or peripherals. Media processing units include, for example, MP3 players, digital video players, PDAs, televisions, digital cameras, medical monitoring devices, printers, and copiers that are capable of receiving and processing media assets (e.g., video, audio, images, animation, presentations, text, etc.) transmitted from the media player 100. In some cases, these media processing units are able to themselves wirelessly transmit media assets to electronic devices such as the media player 100. Peripheral devices on the other hand, are devices that allow the media player 100 to extend certain of its capabilities as a way to improve, for example, data input, visual display, audio output, and other such functions.

Examples of wireless peripherals include, keyboard, mouse, joy stick, display, automobile computer system, and telephone (that gives the media player speaker phone capability when interfaced). When peripherals are attached to the media player 100 via the RFID discovery method described herein, the peripheral takes over one or more functions of the media player (e.g., audio output, data input, etc.). One example of a peripheral capable of taking over multiple functions from the media player 100 is an automobile computer system. An automobile computer system, may as example, extend the media player's user interface to the car's display, the media player's audio output to the car's built-in speakers, and the media player's control functionality to built-in controls in the car.

603 is one example of a device category. The television category listing in 603 includes an icon that visually represents the category and a category name (e.g., Television). At the top left of the screen is a cellular network signal indicator 601, and at the top right is a battery-life indicator 602 for the media player 100. The list of "device profile" categories in FIG. 12 is not meant to be exhaustive. There could be additional categories added to the list.

Category labels could also be standardized amongst device manufacturers as part of a strategy to create a universally accepted RFID transmission format 450 as previously discussed.

Figure 13:
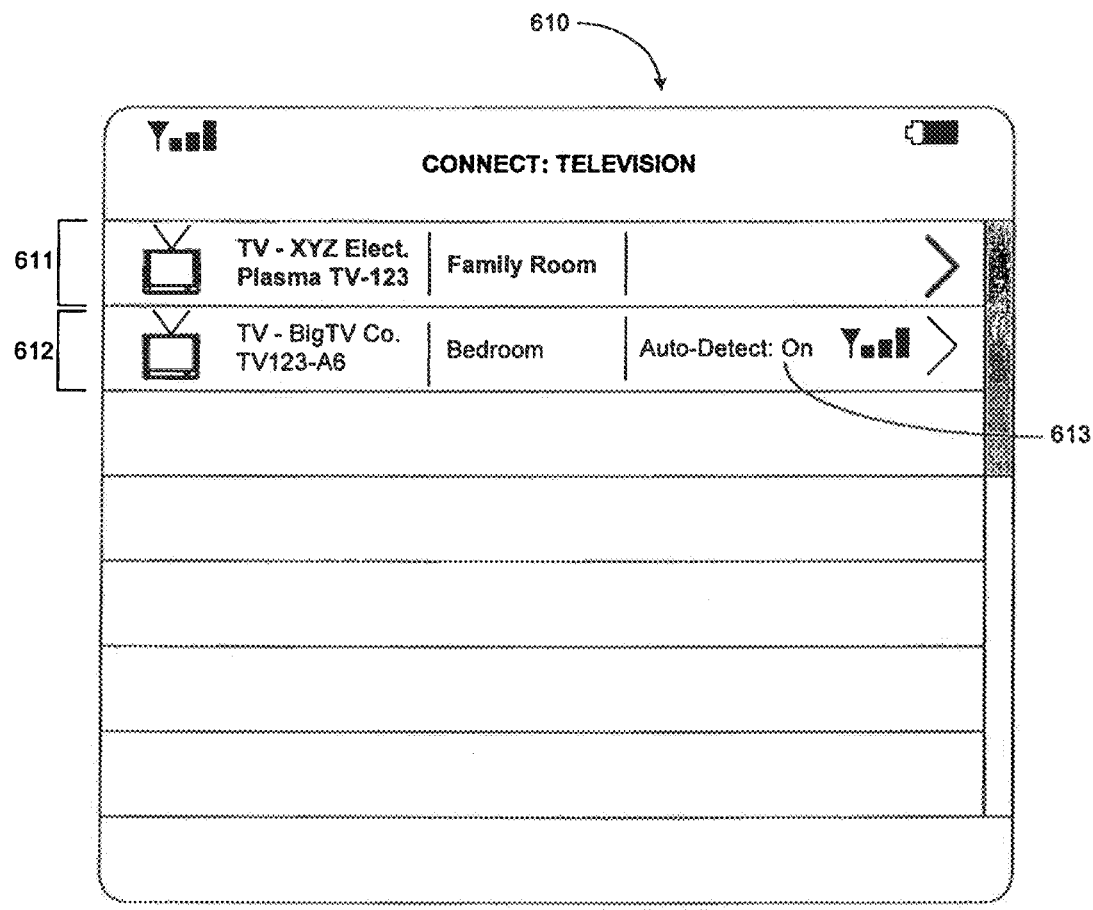
FIG. 13 is an illustration of an exemplary user interface screen depicting one specific device profile category in accordance with one embodiment of the present invention.

FIG. 13 is an illustration of an exemplary user interface screen 610 depicting a specific device profile category in accordance with one embodiment of the present invention. This screen 610 shows the "television" category with two example device profile entries 611 and 612. Both device profile entries show an icon to represent the device, the device type (e.g., TV), manufacturer name (e.g., XYZ Elect.), device model (e.g., Plasma TV-123), and a description of the device which may have been set by the user in the device (e.g., Family Room). Device profile 612 differs from 611 in that an auto-detection setting 613 is represented; this setting is currently turned "on" as illustrated. The setting indicates that the user has specified that he wants the media player 100 to automatically detect and establish a connection with the TV in 612 whenever it is within signal range. This particular example assumes that the television in 612 has, for example, a transceiver (e.g., Ultra Wideband) for high-bandwidth communication with other devices (such as the media player 100).

When the auto-detect setting is turned "on", the RF signal indicator is represented in 613. It may be recalled from before, that the auto-detect and connect functionality may not be available for all electronic devices, and is specified in the RFID transmission information 450 in accordance with the invention. The auto-detect and connect functionality is especially useful for mobile users, as their media player 100 can be set to automatically discover and connect with specific devices when in proximity.

One practical example of how the functionality can be used is described now in accordance with the invention. A user may have a wireless media player 100 in his pocket on which he has his favorite music playlists stored. Rather than listening to the music via a wireless headphone unit 152, the user prefers listening to his music via a stereo system in his home that has surround sound capability. As such, when the user turns on his media player 100 upon waking up in the morning and selects the music he wants to hear, and the media player 100 automatically detects and connects with the stereo system for which a "device profile" exists on the player 100. The player 100 automatically begins transmitting the playing music to the stereo system so the user can enjoy his music via the surround sound capability of the stereo system. Continuing with the example, the same user may be ready to leave his home for work. Upon turning off the power to the stereo, the wireless connection between the stereo and media player 100 is terminated.

The wireless connection may also be dropped by simply exiting the house and leaving the RF coverage area of the stereo (if the stereo's power was left turned on). Either way, the music playing on the media player 100 is automatically paused when the devices lose RF connectivity. Upon getting in his automobile and starting the ignition, the automobile computer turns on its wireless interface. Similarly, the media player 100, auto-detects and connects to the automobile's onboard computer system; begins playing the music that was paused; and transmits the music to the automobile's onboard computer system which includes a media processing unit. This example assumes that a device profile for the automobile computer is first stored in the media player 100 in accordance with the invention.

Continuing with the example further, the user may arrive at his workplace with his media player 100. Upon turning off the car in the parking lot, the wireless connection between the automobile's onboard computer and the media player 100 automatically terminates. This causes the music playing on the media player 100 to be automatically paused. The user then walks into the building and to his office. As the user arrives in his personal office, the media player 100 auto-detects and connects to a small desktop stereo, for which a profile was previously saved in the terminal 100 in accordance with the invention. The media player 100 automatically begins playing and transmitting the media to the desktop stereo in the user's office. This example illustrates just one application for how the auto-detect and connect functionality can be applied and used with RFID device profile information stored in the media player 100.

Figure 14:
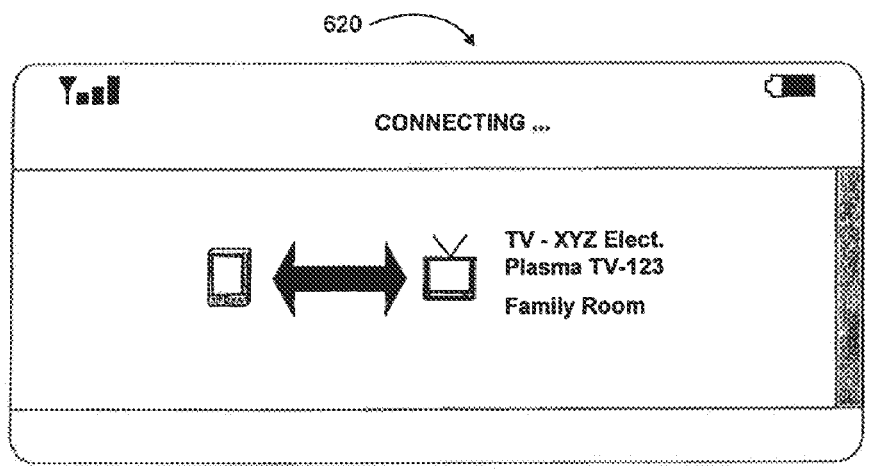
FIG. 14 is an illustration of an exemplary user interface screen depicting messaging that indicates that the media player terminal is wirelessly connecting to a target device, in accordance with one embodiment of the present invention.

FIG. 14 is an illustration of an exemplary user interface screen 620 depicting messaging that indicates that the media player 100 is wirelessly connecting to a target device, in accordance with one embodiment of the present invention. The screen 620 may appear on the media player 100 when an RFID exchange is initiated and the devices attempt to wirelessly connect, or when a device profile is selected in order to establish a manual connection.

Figure 15:
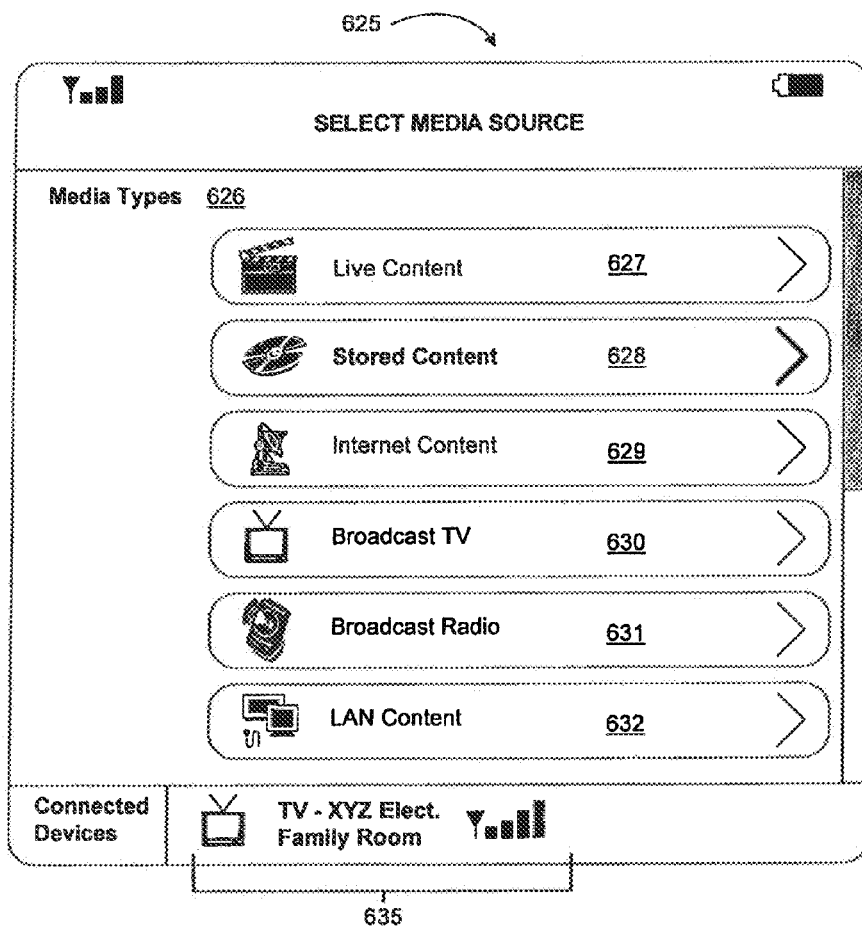
FIG. 15 is an illustration of an exemplary user interface screen depicting options for Media Sources that can be selected in order to select specific media assets for transmission to a target device, in accordance with one embodiment of the present invention.

FIG. 15 is an illustration of an exemplary user interface screen 625 depicting the various options for Media Sources 626 that can be selected in order to locate specific media assets for transmission to a target device, in accordance with one embodiment of the present invention. The media source options represented in the illustration and discussed previously include, "Live Content" 627, "Stored Content" 628, "Internet Content" 629, "Broadcast TV" 630, "Broadcast Radio" 631, and LAN Content 632. Each of these media source options is represented with an icon that represents the content type, and an appropriate label as illustrated in 627, 628, 629, 630, 631, and 632. Elements of 628 appear in bold and are highlighted in order to illustrate the user interface treatment for a menu option that the navigation cursor has landed on.

The screen 625 also shows at the bottom 635, all devices that are currently connected to the media player 100. In this illustration, the Connected Devices section indicates that there is a TV connected to the media player 100. 635 shows an icon of the connected device, the device type (e.g., TV), the manufacturer of the device (e.g., XYZ Elec.), a description (e.g., Family Room), and a signal indicator showing the strength of the RF signal between the devices.

Figure 16:
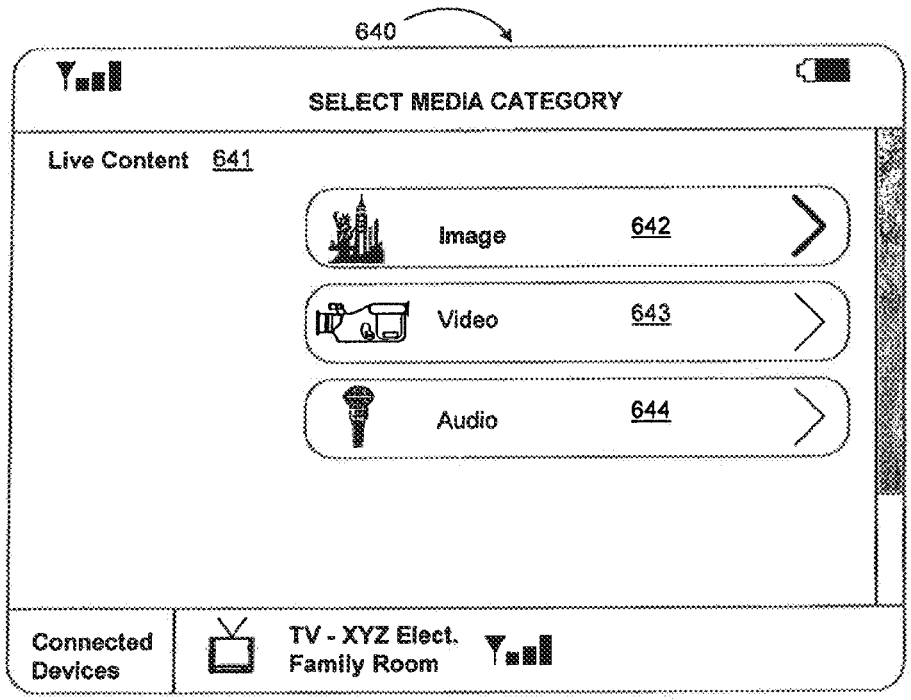
FIG. 16 is an illustration of an exemplary user interface screen depicting Live Content options that can be selected for transmission to a target device, in accordance with one embodiment of the present invention.

FIG. 16 is an illustration of an exemplary user interface screen 640 depicting "Live Content" options 641 for delivery to a target device, in accordance with one embodiment of the present invention. The "Live Content" options represented on the screen include "Image" 642, "Video" 643, and "Audio" 644. Each of these media options is represented with an icon that represents the content type, and an appropriate label as shown in 642, 643, and 644. As previously mentioned, the existence of these options is dependent on the respective media player's media capture capabilities. Selecting any one of these options has the effect of activating the appropriate media capture functionality in the media player 100.

Figure 17:
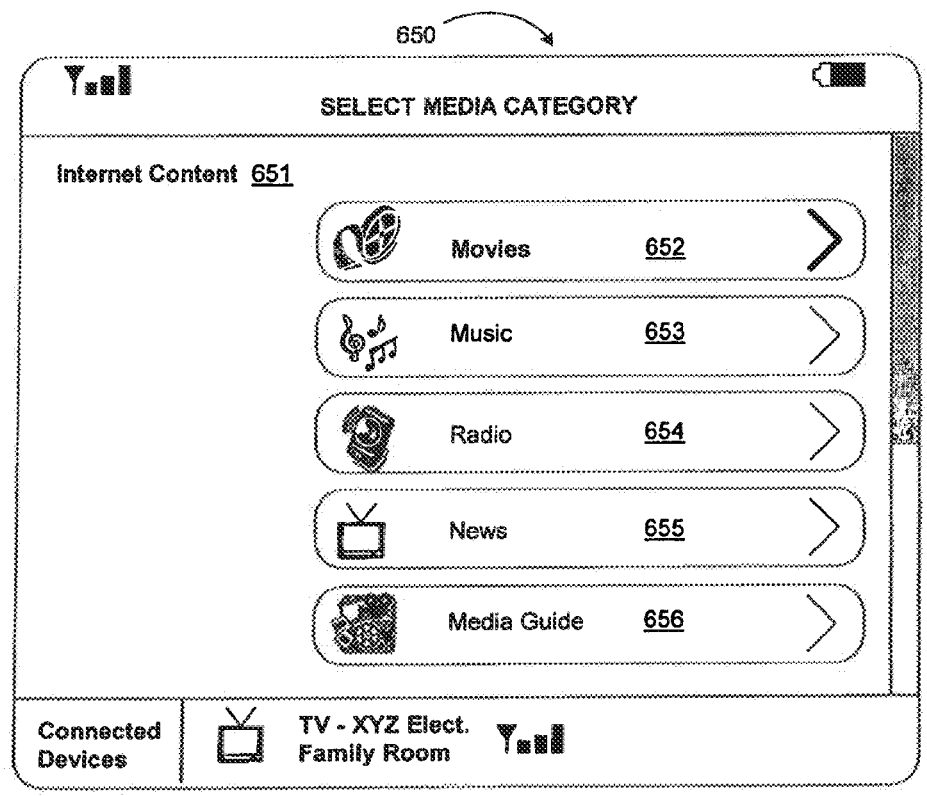
FIG. 17 is an illustration of an exemplary user interface screen depicting Internet Content options from which media assets can be selected for transmission to a target device, in accordance with one embodiment of the present invention.

FIG. 17 is an illustration of an exemplary user interface screen 650 depicting "Internet Content" options 651 from which media assets can be selected for delivery to a target device, in accordance with one embodiment of the present invention. The "Internet Content" options represented on the screen include "Movies" 652, "Music" 653, "Radio" 654, "News" 655, and a "Media Guide" 656. These options provide further access to lists of web sites or content repositories on the Internet. Selecting the "Music" 653 option may, for example, provide the user with a list of sites from which he can download digital music (e.g., Apple iTunes™). The user may have his login settings for certain music download sites stored in the Media manager application 120 operating on the media player 100 so as to allow the media player 100 to automatically login to a selected site. The user may also have a credit card profile or other payment information stored on the media player 100 or with the respective music web site operator, in order to allow automatic payment of music that is selected for download. Each of the "Internet Content" options 651 is represented with an icon that indicates the type of content that can be accessed, and an appropriate label as shown in 652, 653, 654, 655, and 656

Figure 18:
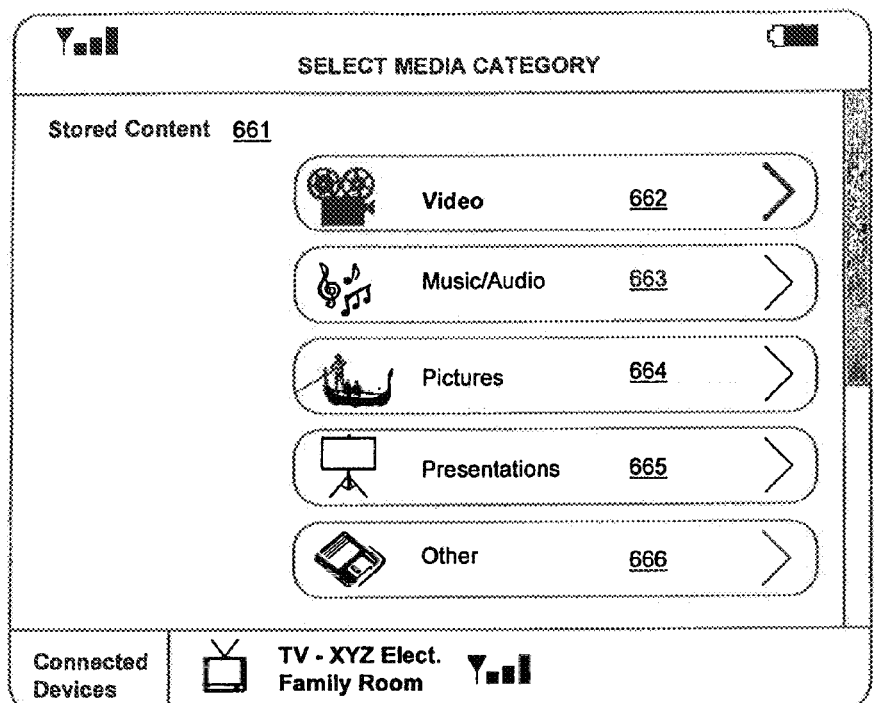
FIG. 18 is an illustration of an exemplary user interface screen depicting Stored Content options from which media assets can be selected for transmission to a target device, in accordance with one embodiment of the present invention.

FIG. 18 is an illustration of an exemplary user interface screen 660 depicting "Stored Content" options 661 from which media assets can be selected for delivery to a target device, in accordance with one embodiment of the present invention. The "Stored Content" options 661 represent categories of media files that reside in the media player's hard drive 112. The "Stored Content" options 661 include "Video" 662, "Music/Audio" 663, "Pictures" 664, "Presentations"

665, and "Other" 666. There may be additional sub-categories under any of these options that allow the user to easily locate specific media content. Content for example may be organized according to genre, theme, artist, and other identifying characteristics. A search engine incorporated in the media manager application 120 allows the user to search for specific content based on various search terms such as type of content, file names, dates, genre, artist, etc.

Figure 19:
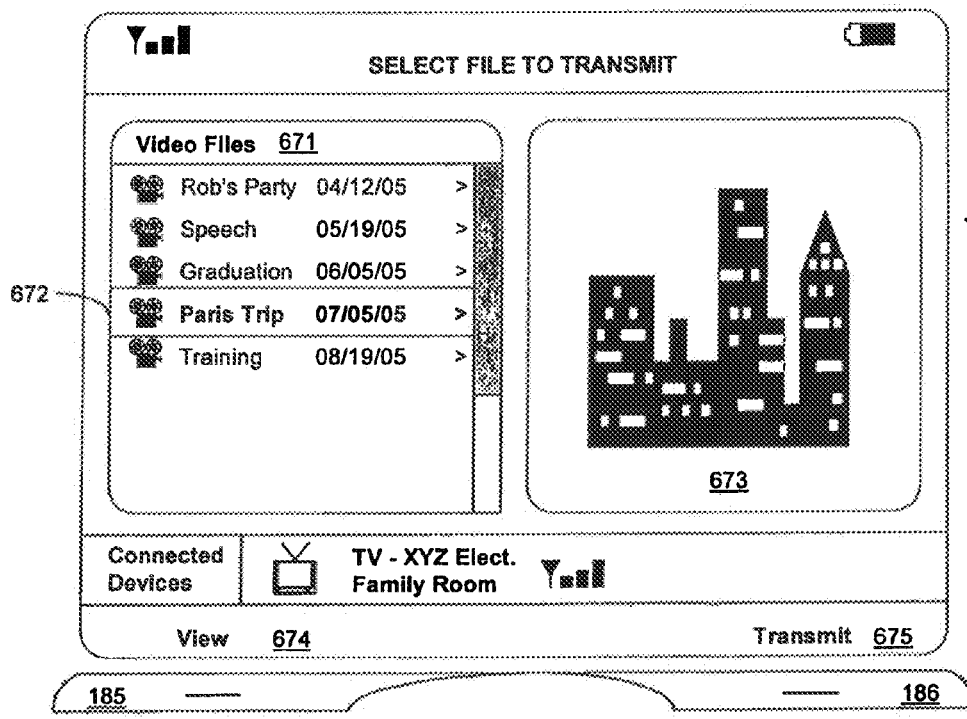
FIG. 19 is an illustration of an exemplary user interface screen depicting Video Files that can be selected for transmission to a target device, in accordance with one embodiment of the present invention.
Figure 20:
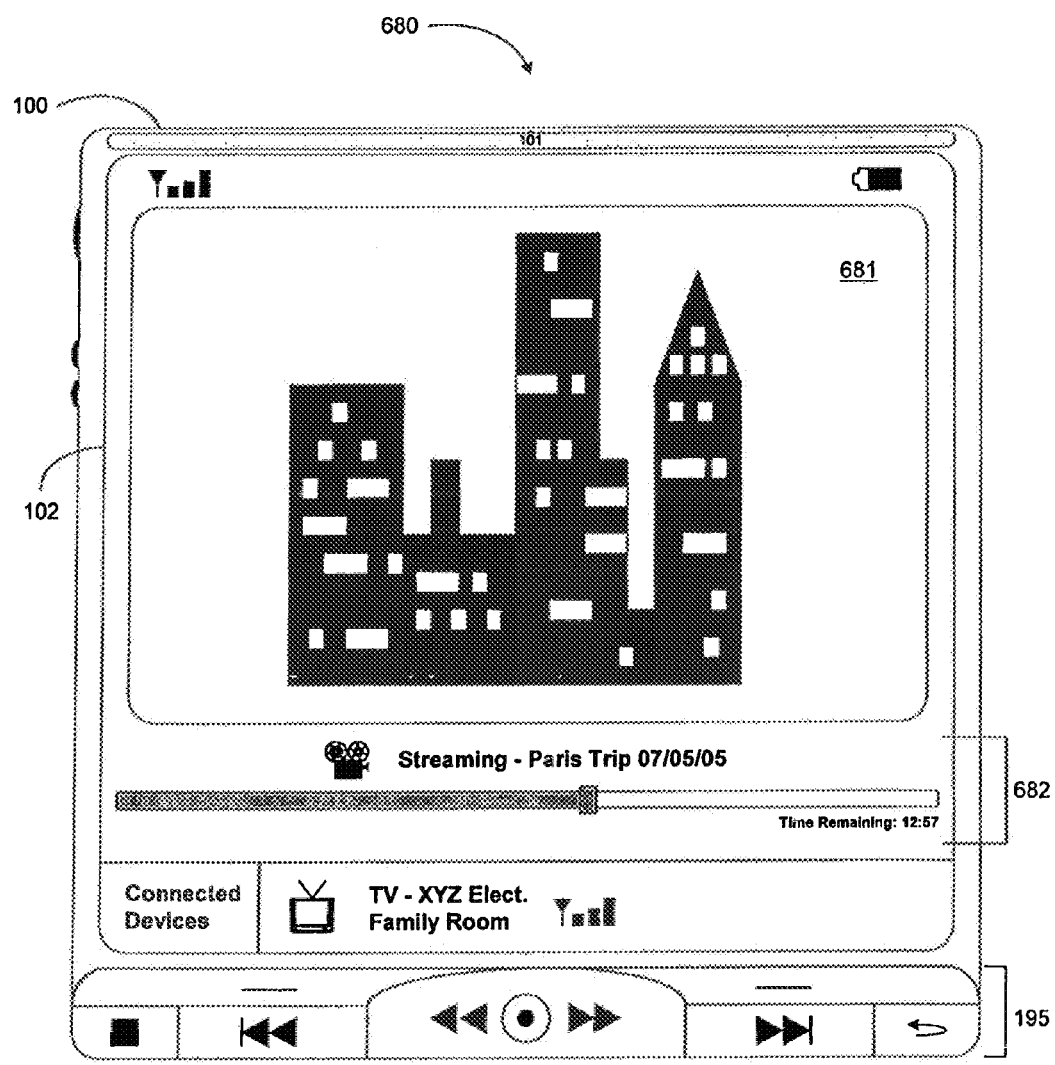
FIG. 20 a front-side perspective view of a media player terminal with an exemplary user interface screen depicting a video file being transmitted to a target device, in accordance with one embodiment of the present invention.

FIG. 19 is an illustration of an exemplary user interface screen 670 depicting "Video Files" 671 that can be selected for transmission to a target device, in accordance with one embodiment of the present invention. 671 shows a list of video files resident in the media player's storage unit 112. The files may be organized according to any number of organization schemes to allow the user to locate specific media files more easily. 672 is an example of a media file that is selected for viewing. 672 shows the user an icon representing that this entry is a video file, the name of the video (Paris Trip), and the date the video was made (Jul. 5, 2005). Other information could also be presented as screen space permits.

The user can select this file 672 from the list and use the left menu selection button 185 on the media player 100 to preview the video before transmitting it to a target device in accordance with the invention. The preview of the video is displayed in a window 673 on the right side of the display screen 102. If the user decides to transmit the same file 672 to a target device in accordance with the invention, he may simply press the right menu selection button 186 on the media player 100. If the media player 100 is connected to the target device, pressing the right menu selection button 186, will initiate transmission to the target device. In another embodiment, if the user desires to transmit the selected media asset 672 to a target device via the Internet as described earlier, pressing the transmit button, will then prompt the user to specify the target recipient's address. As such, a directory or "buddy list" of users stored in the media player 100 may be presented for the user to select from.

FIG. 21 a front-side perspective view 680 of a media player 100 with an exemplary user interface screen depicting a video playing 681 while being transmitted to a target device, in accordance with one embodiment of the present invention. The video that is being transmitted to the target device is shown in 681. 682 provides information on the media asset being transmitted. Included in 682 is an icon to represent the type of media being transmitted (e.g., video, audio/music, etc), the name of the file, the date it was made, and the time remaining in the transmission. Also included in 682 is a sliding bar which visually indicates the amount of time which has elapsed in the media transmission and the relative time remaining. At the bottom of the screen is a list of all devices wirelessly connected to the media player (as previously discussed). In this illustration, it is shown that the "Paris Trip" video is being transmitted to the TV in the family room. The signal strength of RF connectivity with the TV is also represented at the bottom of the screen. Finally, the front-size perspective view of the media player 100 shows the keypad interface 195 used to control media assets and also interact with the operating system and software operating on the media player 100.

It will be readily understood by one of skill in the art that various physical and functional alternatives are possible for the implementation of media player 100 of the present invention. As one example, media player 100 may comprise a device similar to an Apple iPod™ specifically customized to perform some or all of the functions of media player 100 as discussed above. For example, an iPod could be customized to include RFID functionality for receiving from and/or exchanging information with one or more target devices as discussed herein. In this regard, the existing media storage and playback capabilities of the iPod can be combined with the RFID functionality and other teachings of the present invention to obtain the benefits and features outlined and discussed herein.

While this invention has been described in terms of several preferred embodiments, there are alterations, permutations, and equivalents, which fall within the scope of this invention. For example, although the invention has been described in terms of a wireless media player 100, it should be appreciated that certain features of the invention may also be applied to other types of electronic devices (e.g., cameras, music players, video players, PDAs, cellular phones, game players, portable storage devices, headphones, televisions, DVR/PVRs, VCRs, satellite receivers, DVD players, stereos, radios, automobile computer systems, printers, copiers, fax machines, mouse, joy sticks, keyboards, displays, projectors, medical monitoring devices, home appliances, phones, personal computers, notebook computers, routers, switches, remote controls, and the like). It is therefore intended that the following appended claims be interpreted as including all such alterations, permutations, and equivalents as fall within the true spirit and scope of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents

What is claimed is:

1. A method of providing data between a first electronic device and a second electronic device, the method comprising:
   providing a user interface on the first electronic device when a near field communication interface of the first electronic device is communicatively coupled to a near field communication interface of the second electronic device, the user interface having an option to receive at least one data file currently open in an application running on the second device;
   communicating a request from the first electronic device to the second electronic device to provide the at least one data file from the second electronic device;
   receiving the at least one data file of second electronic device with the first electronic device according to the request; and
   providing at least one option in the user interface on the first electronic device to open the at least one data file in an application on the first electronic device.

2. The method of claim 1, wherein the at least one data file from the second electronic device includes at least one of audio data, video data, audio-visual data, image data, text, a presentation, internet content, and mark-up language data.

3. A method of providing data between a first electronic device and a second electronic device, the method comprising:
   selecting content through at least one application running on the first electronic device;
   communicatively coupling a near field communication interface of the first electronic device to a near field communication interface of the second electronic device;

transmitting the selected content associated with the at least one application running on the first electronic device to the second electronic device; and receiving the selected content with the second electronic device to be processed, displayed or stored by the second electronic device automatically or according to a received user input.

4. The method of claim 3, wherein the selected content includes at least one of audio data, video data, audio-visual data, image data, text, a presentation, internet content, and mark-up language data.

5. The method of claim 3, wherein the second electronic device is a printer, and the received selected content is processed to be output by the printer onto a printing medium.

6. The method of claim 3, wherein the selecting of the content through at least one application running on the first electronic device is performed either before or after communicatively coupling the near field communication interface of the first electronic device to the near field communication interface of the second electronic device.

7. A method of providing data between a first electronic device and a second electronic device, the method comprising:

establishing near field communication between the first electronic device and the second electronic device;

receiving identification information from the first electronic device in the second electronic device via the near field communication;

receiving network configuration information from the first electronic device in the second electronic device via the near field communication;

establishing network communication between the first electronic device and the second electronic device based at least in part on the network configuration information;

receiving in the second electronic device a request for data transfer to the first electronic device from the second electronic device via the network communication, the request including at least one data file currently open in an application running on the second electronic device; and transferring the at least one data file from the second electronic device to the first electronic device via the network communication.

8. The method of claim 7, wherein the at least one of data file includes at least one of audio data, video data, audio-visual data, image data, text, a presentation, internet content, and mark-up language data.

9. A method of providing data between a first electronic device and a second electronic device, the method comprising:

establishing network communication between the first electronic device and the second electronic device, the first electronic device including at least one data file currently open in an application running on the first electronic device;

providing a user interface on the second electronic device with an option to initiate a data transmission between the first electronic device and the second electronic device to transfer at least some of the at least one data file currently open in the application running on the first electronic device;

communicating a request from the second electronic device to the first electronic device via the network communication to initiate the data transmission when the option to initiate the data transmission is selected, where the request comprises a request to transfer the at least some of the at least one data file currently open in the application running on the first electronic device; and receiving in the second electronic device the at least some of the at least one data file via the network communication in response to the request to initiate the data transmission.

10. The method of claim 9, wherein the at least one of the data file includes at least one of audio data, video data, audio-visual data, image data, text, a presentation, internet content, and mark-up language data.

11. A method of providing data between a first electronic device and a second electronic device, the method comprising:

providing a user interface on the first electronic device with an option to establish communication with the second electronic device and initiate a data transfer, the second electronic device includes at least one of a data file currently open in an application running on the second electronic device; and when the option to establish communication and initiate the data transfer is selected, establishing communication between the first electronic device and the second electronic device;

communicating a request from the first electronic device to the second electronic device to initiate the data transfer; and receiving in the first electronic device the at least one data file open in the application running on the second electronic device.

12. The method of claim 11, wherein the at least one of the data file includes at least one of audio data, video data, audio-visual data, image data, text, a presentation, internet content, and mark-up language data.

* * * * *